United States Patent [19]

Ikegame et al.

[11] Patent Number: 5,540,503
[45] Date of Patent: Jul. 30, 1996

[54] LINEAR GUIDE APPARATUS

[75] Inventors: Tetsuo Ikegame; Tatsuyuki Uemura; Izumi Yamazaki, all of Tokyo, Japan

[73] Assignee: Olympus Optical Co., Ltd., Japan

[21] Appl. No.: 445,405

[22] Filed: May 19, 1995

[51] Int. Cl.[6] .................................................. F16C 29/04
[52] U.S. Cl. ................................ 384/57; 384/50; 384/54; 384/55
[58] Field of Search .................................. 384/50, 53, 54, 384/55, 57, 58

[56] References Cited

U.S. PATENT DOCUMENTS

| | | | |
|---|---|---|---|
| 3,427,080 | 2/1969 | Folk | 384/55 |
| 3,484,944 | 12/1969 | Pryshlak | 384/57 X |
| 3,897,119 | 7/1975 | McMurtrie | 384/55 |
| 4,648,725 | 3/1987 | Takahashi | 384/58 X |
| 4,846,589 | 7/1989 | Chikuma et al. | 384/50 |

FOREIGN PATENT DOCUMENTS

| | | |
|---|---|---|
| 61-224171 | 10/1986 | Japan . |
| 416670 | 2/1992 | Japan . |
| 4-243069 | 8/1992 | Japan . |
| 5-27862 | 4/1993 | Japan . |

*Primary Examiner*—Thomas R. Hannon
*Attorney, Agent, or Firm*—Laff, Whitesel, Conte & Saret, Ltd.

[57] ABSTRACT

A linear guide apparatus includes a base, a movable member movable to the base, first and second guide receptacles on the movable member, first and second linear guide members, being parallel to each other and received by the first and second receptacles to guide movements of the first and second receptacles, the first guide being fixed on the base and the second guide being arranged on the base, and a pre-load adjusting unit, provided on the base, for supporting the second guide to be movable in parallel to the first guide and for adjusting a distance between the first and second guides, thereby adjusting a pre-load applied between the guides and the receptacles of the movable member. The adjusting unit has a stationary projection fixed on the base, a pre-load block, and pivot angle adjusting mechanism. The block has a recess pivotally seated on the projection to change a pivot angle around the projection, and contacts the second guide, thereby moving the second guide to change the distance between the first and second guides, and the pivot angle adjusting mechanism is adjustable the pivot angle of the block.

33 Claims, 16 Drawing Sheets

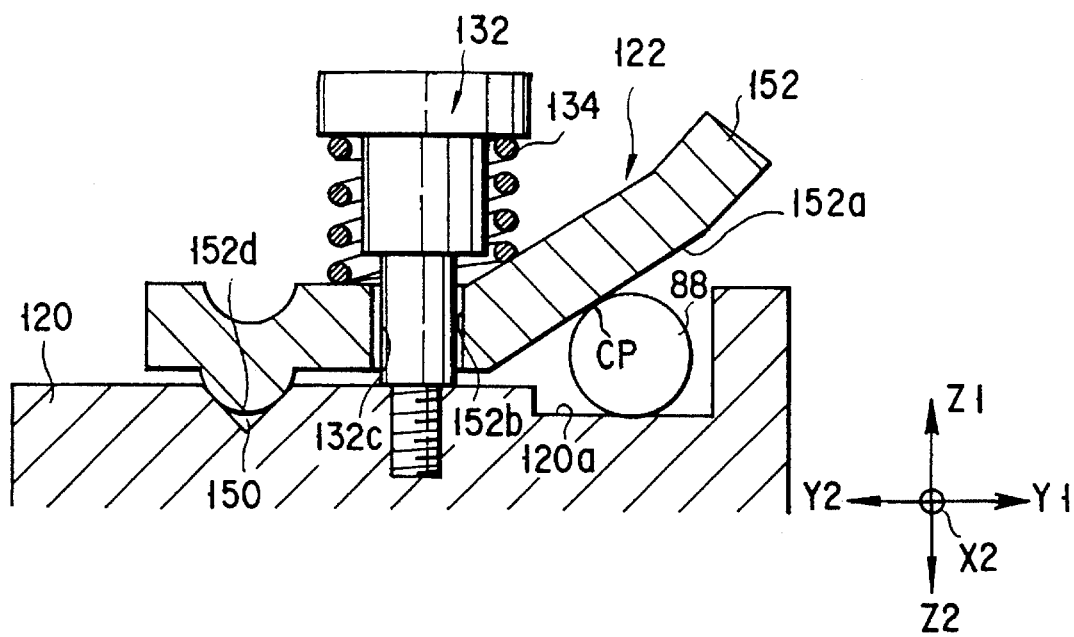
F I G. 11
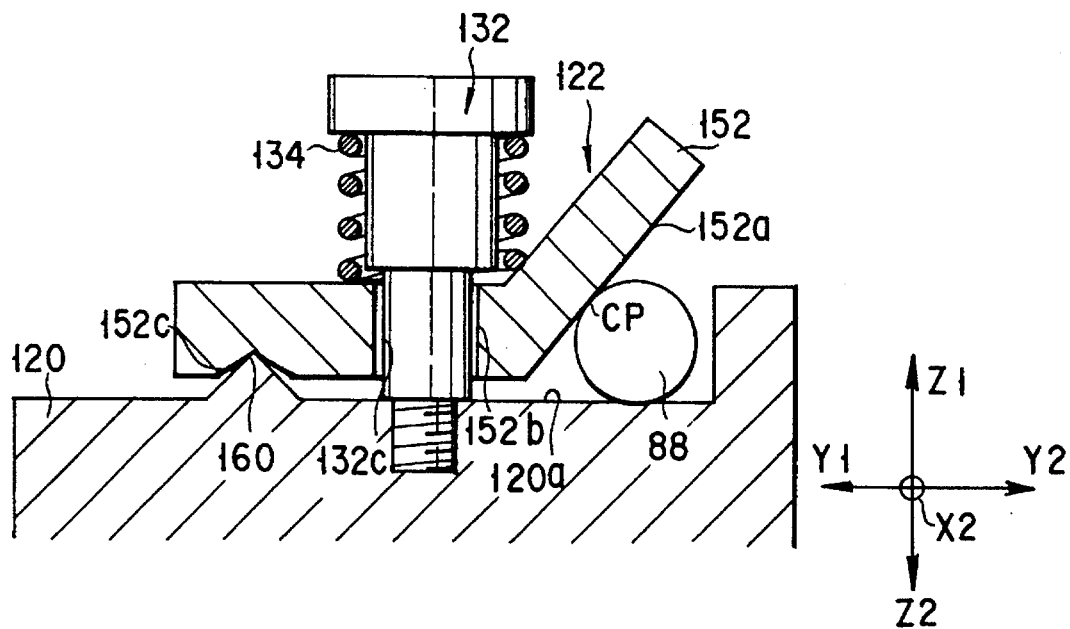
F I G. 12

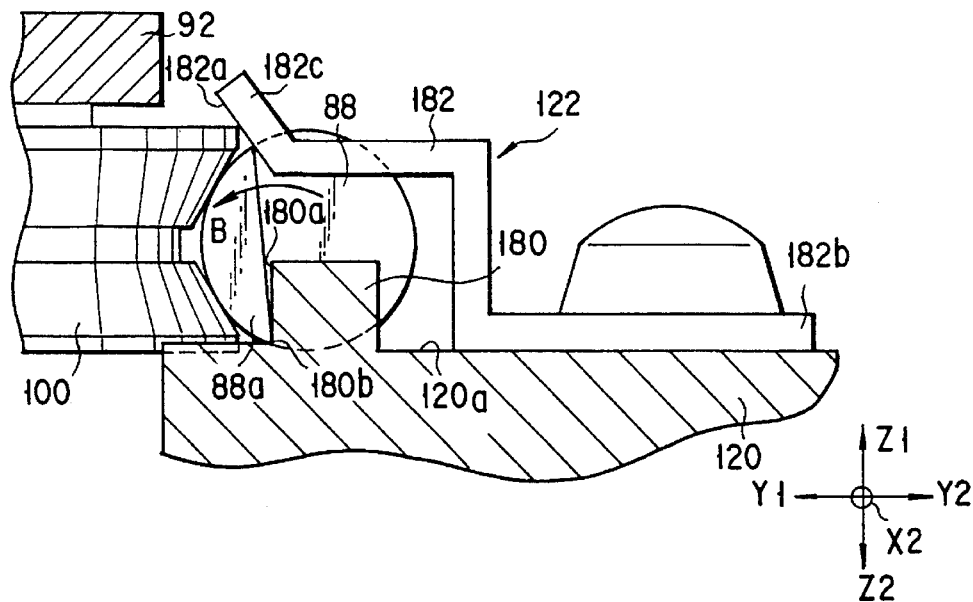
FIG. 16
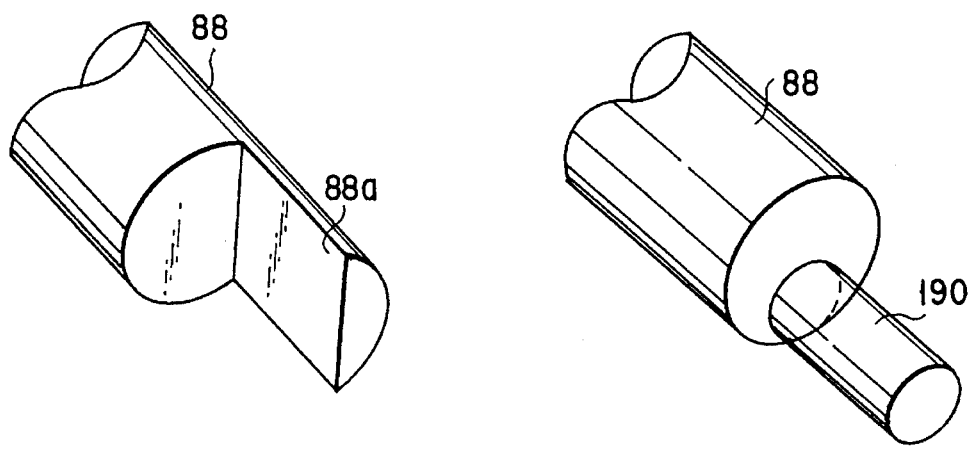
FIG. 17
FIG. 19
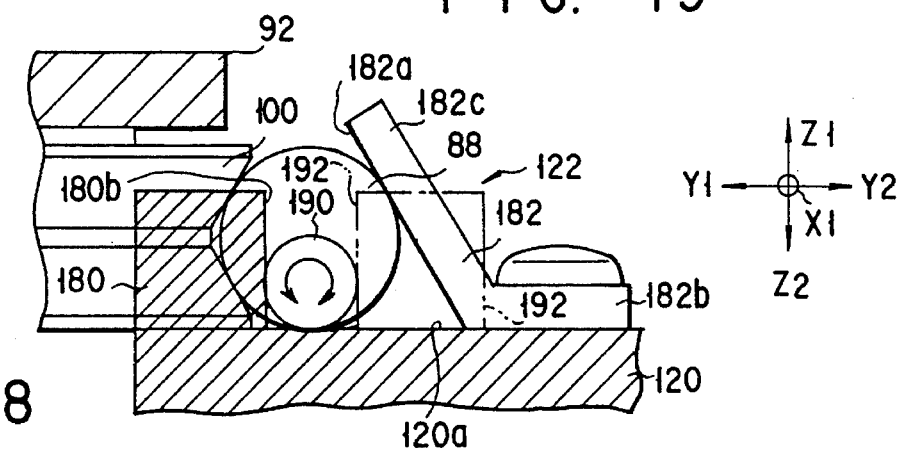
FIG. 18

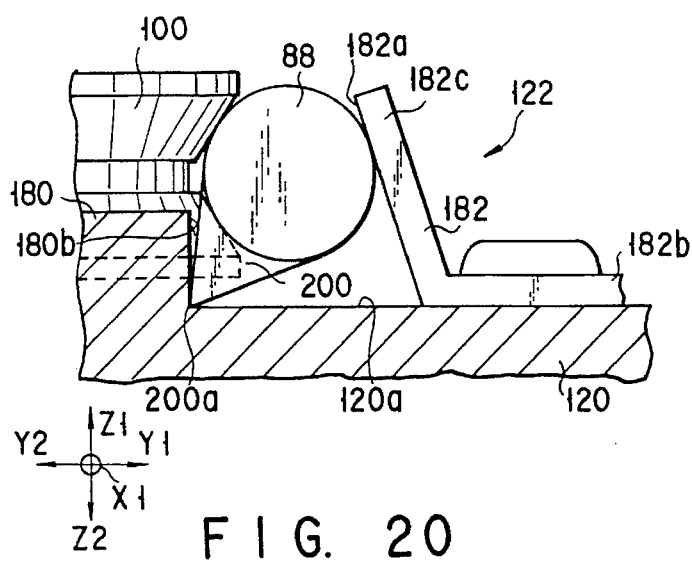
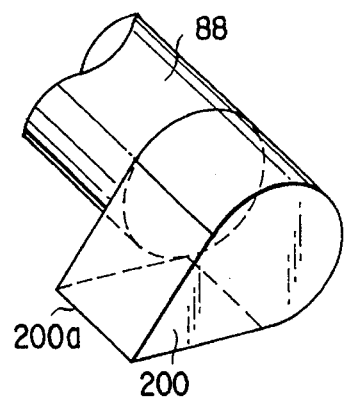
FIG. 20
FIG. 21
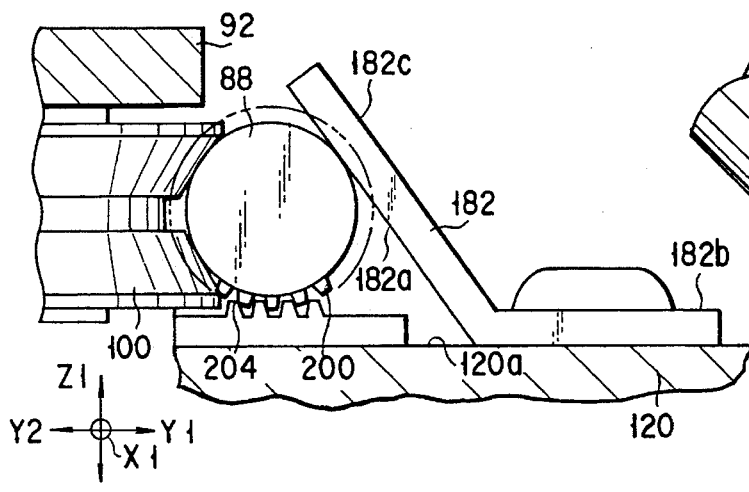
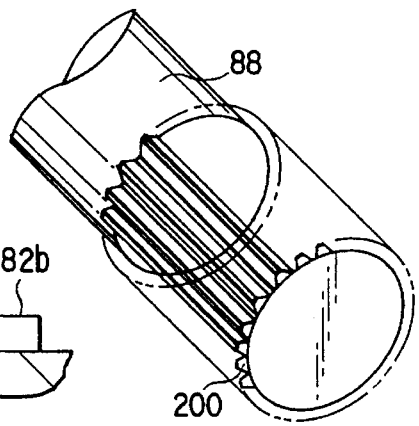
FIG. 22
FIG. 23
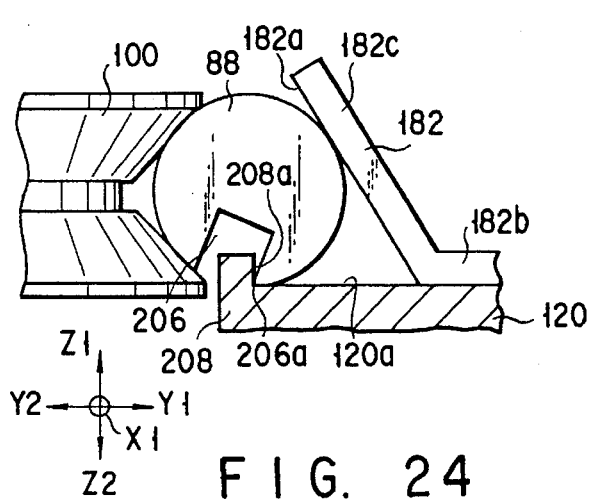
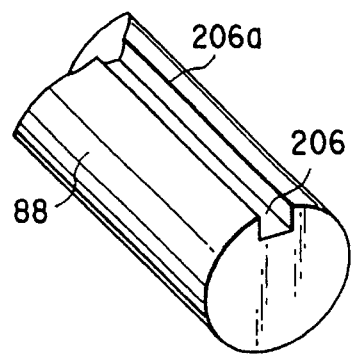
FIG. 24
FIG. 25

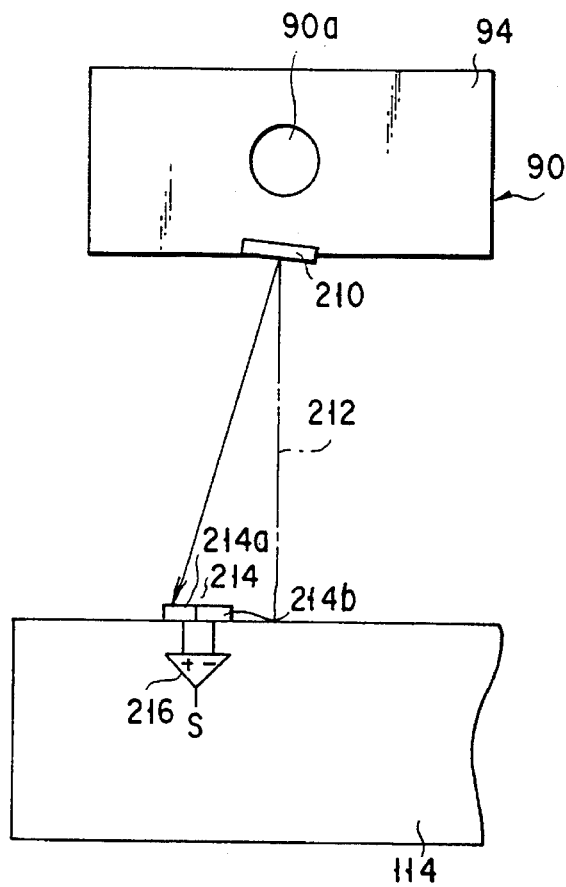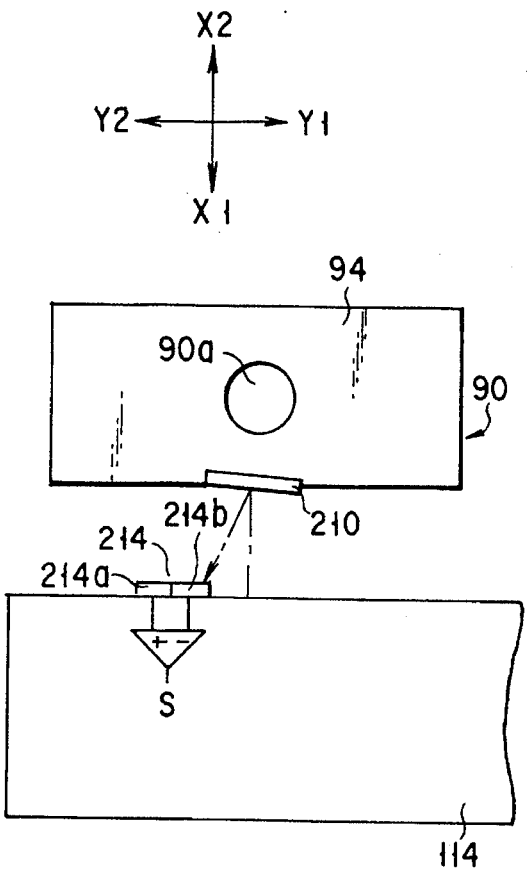
FIG. 27A  FIG. 27B
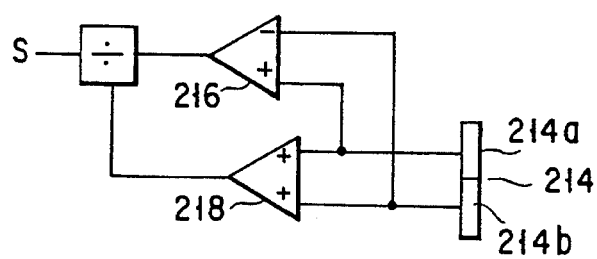
FIG. 27C

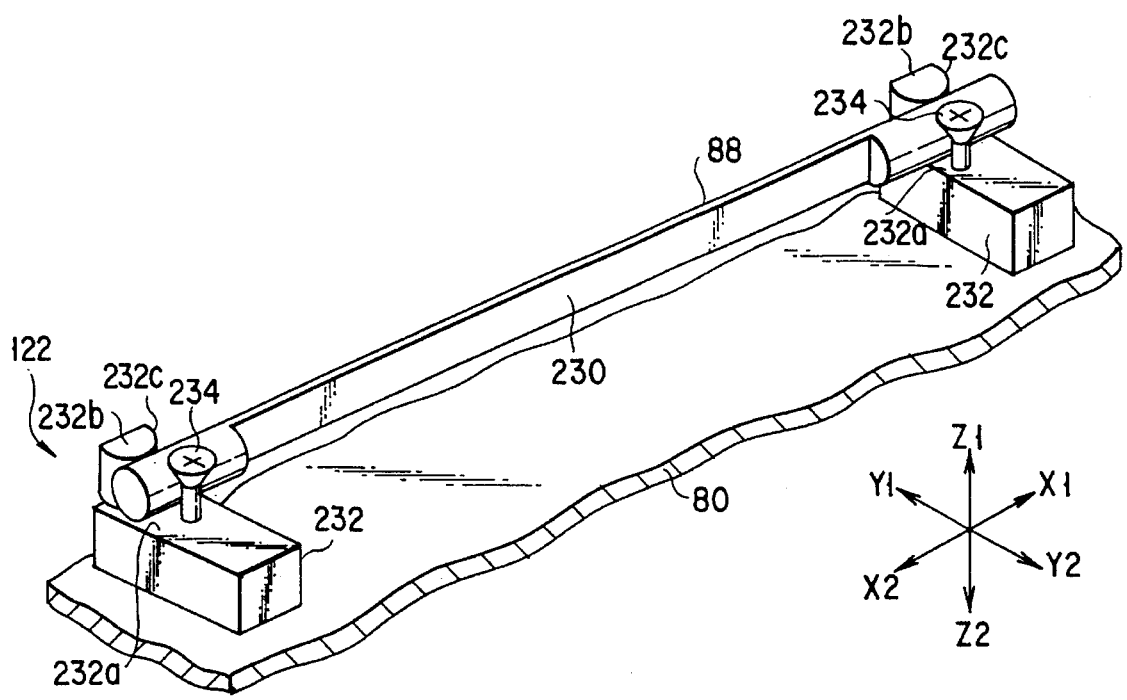
F I G. 30
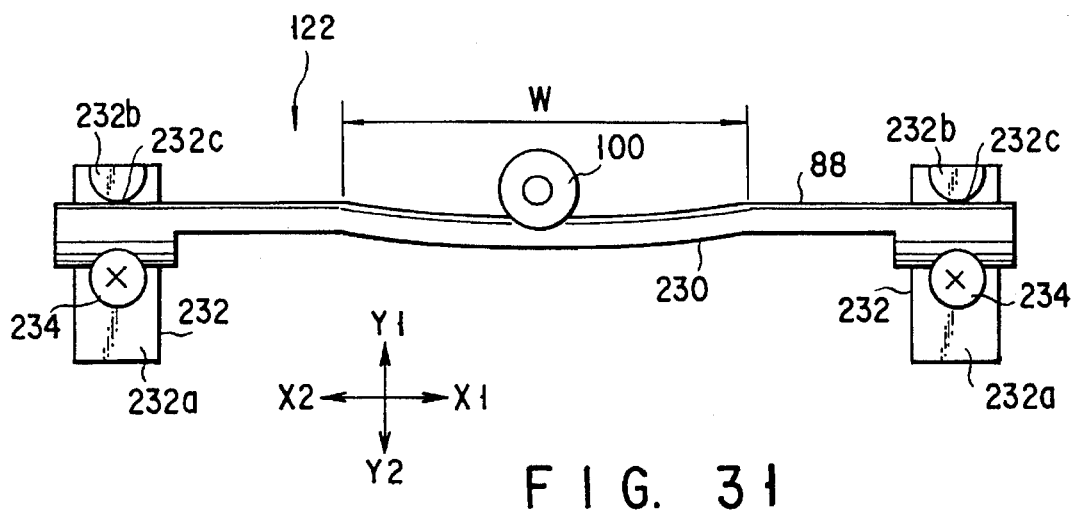
F I G. 31

LINEAR GUIDE APPARATUS

BACKGROUND OF THE INVENTION

1. Field of the Invention

The present invention relates to a linear guide apparatus for supporting a movable member to be linearly movable on a guide member.

2. Description of the Related Art

A linear guide apparatus is used for moving, e.g., an optical or magnetic head of an optical disk drive or a hard disk drive (HDD) in the radial direction (i.e., tracking direction) of an optical or hard disk.

Usually, in a linear guide apparatus (to be merely referred to as a "guide mechanism" hereinafter), a movable member is provided with bearings. These bearings are brought into contact with parallel linear guide members fixed to a stationary chassis of an equipment that uses the linear guide mechanism, thereby guiding the movement of the movable member along the extending direction of the guide members. A small gap is formed between each of the bearings and the corresponding guide member to accept the manufacturing allowances of the bearings and the guide members and to guarantee smooth movement of the bearings on the guide members. These gaps cause rattle, although very small, in the bearings when the bearings move along the guide members.

A linear guide apparatus having a mechanism for eliminating rattle is known in, e.g., Jpn. Pat. Appln. KOKAI Publication No. 4-243069. This conventional linear guide apparatus is used in an optical disk drive. As shown in FIGS. 1 and 2, a pair of first and second linear guide members 42a and 42b are provided on the upper surface of a stationary chassis 40 of the optical disk drive. The first and second guide members 42a and 42b extend parallel to each other in the radial directions (tracking directions), indicated by arrows X1 and X2, of an optical disk (not shown). A movable member 44 having an optical head 44a is arranged between the first and second guide members 42a and 42b above the upper surface of the stationary chassis 40. A pair of roller bearings 46 are rotatably mounted at two positions separated from each other by a predetermined distance in the tracking direction, on a side surface of the movable member 44 facing toward a direction indicated by an arrow Y1. One roller bearing 48 is rotatably mounted on a side surface of the movable member 44 facing toward a direction indicated by an arrow Y2. The roller bearing 48 is located between the pair of roller bearings 46 in the tracking directions indicated by the arrows X1 and X2.

The first guide member 42a on a side indicated by the arrow Y1 is fixed to a first positioning projection 40a on the upper surface of the stationary chassis 40, and the second guide member 42b on a side indicated by the arrow Y2 is mounted on the upper surface of the stationary chassis 40 through a position adjusting mechanism 50. The position adjusting mechanism 50 holds the second guide member 42b to be movable in the directions indicated by the arrows Y1 and Y2 in parallel to the first guide member 42a.

The position adjusting mechanism 50 has a pressing block 52 which is formed such that its section in a Y–Z plane forms a parallelogram so that it is movable on the upper surface of the stationary chassis 40.

As best shown in FIG. 1, first and second inclined side surfaces 52a and 52b of the pressing block 52 arranged in the directions indicated by the arrows Y1 and Y2 are inclined toward the second guide member 42b. The first inclined side surface 52a arranged in the direction indicated by the arrow Y1 contacts the first guide member 42a. A lower edge 52c, arranged in a direction indicated by an arrow Z1, of the second inclined side surface 52b arranged in a direction indicated by the arrow Y2 contacts a second positioning projection 40b extending on the upper surface of the stationary chassis 40 in the same manner as the second guide member 42b. The pressing block 52 is pivotal indicated by a double-headed arrow A with the lower edge 52c of the second inclined side surface 52b being functioning as a rotational center in directions.

A through hole 52d extending in the vertical direction (focusing directions) indicated by arrows Z1 and Z2 is formed in the pressing block 52, and a through hole is formed in the stationary chassis 40 to be concentric with the through hole 52d of the pressing black 52. A screw 54 with a head is inserted in the through hole 52d of the pressing block 52 and the through hole of the stationary chassis 40 from the pressing block 52 side. A nut plate 56 is threadably engaged with the distal end portion of the screw 54 at a position separated downward from the stationary chassis 40 in the direction indicated by the arrow Z2. The nut plate 56 is vertically movable on the lower surface of the stationary chassis 40 while its rotation is prohibited. A compression coil spring 58 is mounted on the screw 54 between the lower surface of the stationary chassis 40 and the nut plate 56.

In this arrangement, when the screw 54 is rotated in one direction to move the nut plate 56 close to the lower surface of the stationary chassis 40, the pressing block 52 is pivoted counterclockwise against the biasing force of the compression coil spring 58 with the lower edge 52c of the second inclined side surface 52b being functioning as the rotational center. As a result, the pressing block 52 presses the second guide member 42b by the first inclined side surface 52a to move the second guide member 42b toward the first guide member 42a. Then, the gaps between the first guide member 42a and the pair of roller bearings 46 of the movable member 44 and between the second guide member 42b and the roller bearing 48 are eliminated so that movement of the movable member 44 without rattle with respect to the first and second guide members 42a and 42b is guaranteed in this manner.

In the conventional apparatus shown in FIGS. 1 and 2, the degree of parallel between the first positioning projection 40a for the first guide member 42a on the upper surface of the stationary chassis 40 and the second guide member 42b for the second guide member 42b and for the passing block 52, and the degree of parallel between the extending direction of the lower edge 52c of the second inclined side surface 52b of the pressing block 52 abutting against the second positioning projection 40b and the first inclined side surface 52a of the pressing block 52 abutting against the second guide member 42b must be considerably high.

In order to satisfy this requirement, high-precision machining is required in the manufacture of the conventional apparatus shown in FIGS. 1 and 2. This increases the manufacturing cost of the conventional apparatus and leads to an increase in cost of the conventional apparatus.

Another linear guide apparatus having a mechanism for eliminating rattle is known in Jpn. Pat. Appln. KOKAI Publication No. 61-224171.

This another linear guide apparatus will be described with reference to FIGS. 3 to 5.

A pair of first and second linear guide members 62a and 62b extending parallel to each other in directions indicated by arrows X1 and X2 are provided on the upper surface of a stationary chassis 60. A movable member 64 is arranged between the first and second guide members 62a and 62b above the upper surface of the stationary chassis 60. A pair of roller bearings 66 are rotatably mounted at two positions separated from each other by a predetermined distance in the directions indicated by the arrows X1 and X2, on a side surface of the movable member 64 facing toward a direction indicated by an arrow Y1. One roller bearing 68 is rotatably mounted on a side surface of the movable member 64 facing toward a direction indicated by an arrow Y2. The roller bearing 68 is located between the pair of roller bearings 66 in the tracking directions indicated by the arrows X1 and X2.

The first guide member 62a arranged on a side indicated by the arrow Y1 is fixed on the upper surface of the stationary chassis 60. The two end portions, arranged in the directions indicated by the arrows X1 and X2, of the second guide member 62b arranged on a side indicated by the arrow Y2 are mounted on the upper surface of the stationary chassis 60 through a pair of position adjusting mechanisms 70. The pair of position adjusting mechanisms 70 hold the second guide member 62b to be movable in the directions indicated by the arrows Y1 and Y2 with the second guide member 62b being in parallel to the first guide member 62a, and have compression coil springs 70a for biasing the second guide member 62b toward the first guide member 62a.

In this another conventional linear guide apparatus, the second guide member 62b pressed against the roller bearing 68 of the movable member 64 between the pair of position adjusting mechanisms 70, is flexed at a portion abutted against the bearing 68 in the direction indicated by the arrow Y2. When the movable member 64 is moved along the first and second guide members 62a and 62b, the pressure applied to the compression coil springs 70a of the pair of positioning mechanisms 70 through the second guide member 62b change to expand or contract the compression coil springs 70a. Expansion/contraction of the compression coil springs 70a causes frictional resistance with respect to the housings accommodating the compression coil springs 70a to interfere with smooth expansion/contraction (i.e., smooth movement of the second guide member 62b) of the compression coil springs 70a. Then, frictional resistance generated between the movable member 64 and the first and second guide members 62a and 62b during movement of the movable member 64 is slightly changed, and leads to non-uniformity in moving speed of the movable member 64.

SUMMARY OF THE INVENTION

The present invention has been derived from the above situations, and an object of the present invention is to provide a linear guide apparatus which can support a movable member to be linearly movable more smoothly on guide members, is less expensive and is smaller than in a conventional apparatus.

In order to achieve the above object, a first linear guide apparatus according to the present invention comprises: a base; a movable member formed independently of the base and movable with respect to the base; first and second guide receptacles provided to the movable member; a first guide member, fixed on the base, extending linearly, and received by the first guide receptacle, for guiding a moving direction of the first guide receptacle; a second guide member, arranged on the base to extend in the same direction as that of the first guide member to be in parallel to the first guide member, and received by the second guide receptacle, for guiding a moving direction of the second guide receptacle; and pre-load adjusting means, provided on the base, for supporting the second guide member to be movable in parallel to the first guide member and adjusting a distance between the first and second guide members, thereby adjusting a pre-load applied between the first and second guide members and the first and second guide receptacles of the movable member. The pre-load adjusting means includes a stationary projection fixed on the base, a pre-load block, and pivot angle adjusting means. The pre-load block has a recessed portion to be pivotally seated on the stationary projection and to change the pivot angle around the stationary projection, and is brought into contact with the second guide member, thereby moving the second guide member to change the distance between the first and second guide members. Further, the pivot angle adjusting means is adjustable the pivot angle of the pre-load block.

High-precision machining of the surface of the stationary projection can be performed easily, and machining of the recessed portion of the pre-load block can be easily performed at high precision. Therefore, the linear guide apparatus can be formed to have a smaller size at a lower cost than the conventional apparatus described above.

In the first linear guide apparatus according to the present invention which has the above described arrangement, a surface region of the pre-load block which is brought into contact with the second guide member can be constituted by an inclined surface which cooperates with a surface of the base to sandwich the second guide member, and the pivot angle adjusting means can be a screw member which extends through the pre-load block and threadably engages with the base to adjust a threadable engaging amount with the base so that the pivot angle of the pre-load block on the stationary projection is changed.

These pre-load block and screw member can be prepared easily.

In the first linear guide apparatus according to the present invention, the stationary projection of the pre-load adjusting means can be formed independently of the base.

This stationary projection can be easily obtained as a commercially available product.

If a portion of an outer surface of the stationary projection of the pre-load adjusting means on which the recessed portion of the pre-load block is seated is constituted by at least a part of a circle or ball, formation of the stationary projection can be facilitated.

If the stationary projection has at least a circular cross section, formation of the stationary projection can be further facilitated. In this case, a positioning projection is formed on the base, the stationary projection is arranged along the base portion of the positioning projection, and the stationary projection is sandwiched between the recessed portion of the pre-load block and the base portion of the positioning projection, thereby facilitating positioning of the stationary projection.

If the stationary projection has at least a circular cross section, a positioning recessed portion is formed in the surface of the base to seat the stationary projection therein, and the stationary projection is sandwiched between the recessed portion of the pre-load block and the positioning recessed portion, thereby facilitating positioning of the stationary projection.

The positioning recessed portion can be formed with higher precision easier than the positioning projection.

In the first linear guide apparatus according to the present invention, the stationary projection of the pre-load adjusting means can be formed integrally with the base.

In this case, it is preferable that an outer surface of the stationary projection forms a corner portion projecting outward, and that the recessed portion of the pre-load block is formed of a corner portion having an open angle of 90° to 180°.

This recessed portion can be formed easily at high precision.

In order to achieve the above object, a second linear guide apparatus according to the present invention comprises: a base; a movable member formed independently of the base and movable with respect to the base; first and second guide receptacles provided to the movable member; a first guide member, fixed on the base, extending linearly, and received by the first guide receptacle, for guiding a moving direction of the first guide receptacle; a second guide member, arranged on the base to extend in the same direction as that of the first guide member to be in parallel to the first guide member, and received by the second guide receptacle, for guiding a moving direction of the second guide receptacle; and pre-load adjusting means, provided on the base, for supporting the second guide member to be movable in parallel to the first guide member and adjusting a distance between the first and second guide members, thereby adjusting a pre-load applied between the first and second guide members and the first and second guide receptacles of the movable member.

The pre-load adjusting means includes a positioning recessed portion formed in the base, a pre-load block, and pivot angle adjusting means. The pre-load block has a projection to be pivotally seated in the positioning recessed portion and to change the pivot angle around the projection, and is brought into contact with the second guide member, thereby moving the second guide member to change the distance between the first and second guide members. The pivot angle adjusting means is adjustable the pivot angle of the pre-load block.

High-precision machining of the positioning recessed portion can be performed easily, and machining of the projection of the pre-load block can be easily performed at high precision. Therefore, the linear guide apparatus can be formed to have a smaller size at a lower cost than the conventional apparatus described above.

In the second linear guide apparatus according to the present invention which has the above arrangement, the pre-load block can be formed of a plate member. A surface region of the pre-load block which is brought into contact with the second guide member can be constituted by an inclined surface which cooperates with a surface of the base to sandwich the second guide member, and the projection can be formed on the pre-load block by press work. Further, the pivot angle adjusting means can be a screw member, which extends through the pre-load block and threadably engages with the base to adjust a threadable engaging amount with the base so that the pivot angle of the pre-load block on the stationary projection is changed.

These pre-load block and pivot angle adjusting means can be prepared easily.

In order to achieve the above object, a third linear guide apparatus according to the present invention, comprises: a base; a movable member formed independently of the base and movable with respect to the base; first and second guide receptacles provided to the movable member; a first guide member, fixed on the base, extending linearly, and received by the first guide receptacle, for guiding a moving direction of the first guide receptacle; a second guide member, arranged on the base to extend in the same direction as that of the first guide member to be in parallel to the first guide member, and received by the second guide receptacle, for guiding a moving direction of the second guide receptacle; and pre-load adjusting means, provided on the base, for supporting the second guide member to be movable in parallel to the first guide member and adjusting a distance between the first and second guide members, thereby adjusting a pre-load applied between the first and second guide members and the first and second guide receptacles of the movable member.

The pre-load adjusting means includes a positioning projection formed on the base, a pre-load block, and pivot angle adjusting means. The pre-load block has a projection to be pivotally seated in a base portion of the positioning projection and to change a pivot angle around the projection, and is brought into contact with the second guide member, thereby moving the second guide member to change the distance between the first and second guide members. The pivot angle adjusting means is adjustable the pivot angle of the pre-load block.

A surface region of the pre-load block which is brought into contact with the second guide member is constituted by an inclined surface which cooperates with a surface of the base to sandwich the second guide member. The pre-load block has another inclined surface at a position separated from the surface region, and the another inclined surface faces toward a direction substantially opposite to the surface region and is inclined with respect to the surface region.

The extending lines of the surface region and another inclined surface intersect at an angle of about 2° to 45°.

The pre-load block further has still another inclined surface intersecting the surface region and the another inclined surface to form an intersecting angle which is not more than 90° with the still another inclined surface and which is set smaller than an intersecting angle of a base portion of the positioning projection with the surface of the base at an intersecting region on the base in which the base portion of the positioning projection intersects the surface of the base. The projection of pre-load block is constituted by intersecting portion of the another inclined surface and the still another inclined surface.

Since the pre-load block having the above described arrangement can be easily formed at high precision by injection-molding with a synthetic resin, it can be formed easily. Therefore, the linear guide apparatus can be manufactured at a lower cost and have a smaller size than the conventional apparatus described above.

In this pre-load block, it is preferable that a cross section of a vertex of the projection is constituted by a curved surface, and that the projection is brought into contact with a surface of the base portion of the positioning projection and the surface of the base at the intersecting region on the base.

This projection cannot be easily damaged by an external force.

In the third linear guide apparatus according to the present invention, the pivot angle adjusting means can be constituted by a screw member which extends through the pre-load block and threadably engages with the base to adjust a threadable engaging amount with the base so that the pivot angle of the pre-load block on the stationary projection is changed.

This pivot angle adjusting means can be prepared easily.

In order to achieve the above object, a fourth linear guide apparatus according to the present invention, comprises: a base; a movable member formed independently of the base and movable with respect to the base; first and second guide receptacles provided to the movable member; a first guide member, fixed on the base, extending linearly, and received by the first guide receptacle, for guiding a moving direction of the first guide receptacle; a second guide member, arranged on the base to extend in the same direction as that of the first guide member to be in parallel to the first guide member, and received by the second guide receptacle, for guiding a moving direction of the second guide receptacle; and pre-load adjusting means, provided on the base, for supporting the second guide member to be movable in parallel to the first guide member and adjusting a distance between the first and second guide members, thereby adjusting a pre-load applied between the first and second guide members and the first and second guide receptacles of the movable member.

The pre-load adjusting means includes a stationary projection fixed on the base, and an elastic block fixed on the base and having an inclined surface which is brought into contact with the second guide member and cooperates with the stationary projection to sandwich the second guide member.

The second guide member has a recessed portion to be pivotally seated on the stationary projection, and changes a pivot angle around the stationary projection so as to elastically deform the elastic block, thereby changing a distance between the first and second guide members so that a pre-load applied between the first and second guide members and the first and second guide receptacles of the movable member is changed.

These elastic block and second guide member can be prepared easily. Therefore, the linear guide apparatus can be manufactured to have a smaller size at a lower cost than the conventional apparatus described above.

In the fourth linear guide apparatus according to the present invention, the stationary projection of the pre-load adjusting means can be formed independently of the base.

A portion of an outer surface of the stationary projection of the pre-load adjusting means which is seated in the recessed portion of the second guide member block can be at least part of a circle or ball.

The stationary projection of the pre-load adjusting means is seated in a positioning recessed portion formed in the surface of the base, and is sandwiched between the recessed portion of the second guide member and the positioning recessed portion.

In order to achieve the above object, a fifth linear guide apparatus according to the present invention, comprises: a base; a movable member formed independently of the base and movable with respect to the base; first and second guide receptacles provided to the movable member; a first guide member, fixed on the base, extending linearly, and received by the first guide receptacle, for guiding a moving direction of the first guide receptacle; a second guide member, arranged on the base to extend in the same direction as that of the first guide member to be in parallel to the first guide member, and received by the second guide receptacle, for guiding a moving direction of the second guide receptacle; and pre-load adjusting means, provided on the base, for supporting the second guide member to be movable in parallel to the first guide member and adjusting a distance between the first and second guide members, thereby adjusting a pre-load applied between the first and second guide members and the first and second guide receptacles of the movable member.

The pre-load adjusting means includes engaging means fixed on the base, an elastic block fixed on the base and having an inclined surface which is brought into contact with the second guide member and cooperates with the engaging means to sandwich the second guide member, and engaged means engageable with the engaging means fixed on the base at the second guide member.

The second guide member changes a pivot angle around an engaging position between the engaged means and the engaging means on the base so as to elastically deform the elastic block, thereby changing a distance between the first and second guide members so that a pre-load applied between the first and second guide members and the first and second guide receptacles of the movable member is changed.

The engaging means, the engaged means, the elastic block, and the second guide member described above can be easily prepared at high precision. Therefore, the linear guide apparatus can be manufactured to have a smaller size at a lower cost than the conventional apparatus described above.

For example, the engaging means on the base can have a stationary projection fixed on the base, and the engaged means of the second guide member can have an engaging projection at two separate positions of which are engaged with the stationary projection and the inclined surface of the elastic block.

A region of an outer surface of the second guide member which is brought into contact with the second guide receptacle can have a cross section forming at least part of a circle, and the engaging projection of the second guide member can be projected in an extending direction of the second guide member in the cross section of the second guide member.

Furthermore, the second guide member can have a substantially circular cross section, and the engaging projection of the second guide member can project from two end faces of the second guide member in the extending direction of the second guide member.

This second guide member can be easily prepared at high precision.

Furthermore, in the fifth linear guide apparatus according to the present invention and having the above described arrangement, for example, the engaging means on the base can have a stationary projection fixed on the base, the second guide member can have a substantially circular cross section, the engaged means of the second guide member can have an engaging projection which projects from the second guide member and which is engaged with the stationary projection at a position displaced from a central position of the cross section, and an outer circumferential surface of the second guide member can be in contact with the inclined surface of the elastic block at a position on the outer circumferential surface which is spaced apart from the engaging projection.

These engaging means, engaged means, and second guide member can be easily prepared at high precision.

Furthermore, in the fifth linear guide apparatus according to the present invention and having the above described arrangement, for example, the engaging means on the base can have a rack fixed on the base and extending in a moving direction of the second guide member relative to the first guide member, the second guide member can have a substantially circular cross section, the engaged means of the second guide member can have a gear formed on an outer surface of an engaging projection projecting concentrically from each of two end surfaces of the second guide member in an extending direction thereof, and the second guide member can be in contact with the inclined surface of the elastic block at a position on an outer circumferential surface of the second guide member spaced apart from a position on the outer circumferential surface where the gear of the engaged means meshes with the rack of the engaging means of the base.

These engaging means, engaged means, and second guide member can be easily prepared at high precision.

Furthermore, in the fifth linear guide apparatus according to the present invention and having the arrangement as described above, for example, the engaging means on the base can have a stationary projection fixed on the base, the second guide member can have a substantially circular cross section, the engaged means of the second guide member can have a recessed engaging portion formed in an outer circumferential surface of the second guide member and engaged with the stationary projection on the base, and the second guide member can be in contact with the inclined surface of the elastic block at a position on the outer circumferential surface of the second guide member which is spaced apart from the recessed engaging portion.

These engaging means, engaged means, and second guide member can be easily prepared at high precision.

In order to achieve the above object, a sixth linear guide apparatus according to the present invention, comprises: a base; a movable member formed independently of the base and movable with respect to the base; first and second guide receptacles provided to the movable member; a first guide member, fixed on the base, extending linearly, and received by the first guide receptacle, for guiding a moving direction of the first guide receptacle; a second guide member, arranged on the base to extend in the same direction as that of the first guide member to be in parallel to the first guide member, and received by the second guide receptacle, for guiding a moving direction of the second guide receptacle; and pre-load adjusting means, provided on the base, for supporting the second guide member to be movable in parallel to the first guide member and adjusting a distance between the first and second guide members, thereby adjusting a pre-load applied between the first and second guide members and the first and second guide receptacles of the movable member.

The pre-load adjusting means has a fixing member which has an elasticity and fixes at least two positions thereof on the base, the at least two positions are spaced apart from each other in an extending direction of the second guide member, and the pre-load adjusting means presses the second guide member against the second guide receptacle with the elasticity of the fixing member.

The above described pre-load adjusting means can be easily prepared at high precision. Therefore, the linear guide apparatus can be manufactured to have a smaller size at a lower cost than the conventional apparatus described above.

In order to achieve the above object, a seventh linear guide apparatus according to the present invention, comprises: a base; a movable member formed independently of the base and movable with respect to the base; first and second guide receptacles provided to the movable member; a first guide member, fixed on the base, extending linearly, and received by the first guide receptacle, for guiding a moving direction of the first guide receptacle; a second guide member, arranged on the base to extend in the same direction as that of the first guide member to be in parallel to the first guide member, and received by the second guide receptacle, for guiding a moving direction of the second guide receptacle; and pre-load adjusting means, provided on the base, for supporting the second guide member to be movable in parallel to the first guide member and adjusting a distance between the first and second guide members, thereby adjusting a pre-load applied between the first and second guide members and the first and second guide receptacles of the movable member.

The pre-load adjusting means has a fixing member which fixes at least two positions thereof on the base, the at least two positions are spaced apart from each other in an extending direction of the second guide member, and the second guide member is pressed against the second guide receptacle between the two positions with an elasticity thereof.

The above described pre-load adjusting means can be easily prepared at high precision. Therefore, the linear guide apparatus can be manufactured to have a smaller size at a lower cost than the conventional apparatus described above.

In the seventh linear guide apparatus according to the present invention and having the above described arrangement, the fixing member can have an elasticity, and the second guide member can further be pressed against the second guide receptacle with the elasticity of the fixing member.

This fixing member can be easily prepared.

In the seventh linear guide apparatus according to the present invention and having above described arrangement, a region of the second guide member located between the two positions has a thickness smaller than that of portions of the second guide member in a moving direction of the region relative to the first guide member, and the region corresponds to the two positions.

This second guide member can be prepared easily.

In the seventh linear guide apparatus according to the present invention and having the above described arrangement, the second guide member and the fixing member can be integrally formed of a plate member.

These second guide member and fixing member can be easily prepared.

In this case, a region of an outer surface of the second guide member which is brought into contact with the second guide receptacle of the movable member can be constituted by a curved surface projecting toward the second guide receptacle in a cross section thereof, and a recessed portion recessed toward the second guide receptacle in a cross section thereof can be formed in another region of the outer surface of the second guide member which opposes in a direction opposite to the region in a moving direction of the second guide member with respect to the first guide member.

These second guide member and fixing member are lightweight and inexpensive.

In the seventh linear guide apparatus according to the present invention, the second guide member, the fixing member, and the base can be integrally formed with each other.

With this arrangement, the second guide member, the fixing member, and the base can be prepared easily at a low cost.

Further, the fixing member and the base can be integrally formed with each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 11 is a schematic cross-sectional view of a main part of a linear guide apparatus according to a second embodiment of the present invention;

FIG. 12 is a schematic cross-sectional view of a main part of a third modification of the linear guide apparatus shown in FIG. 6;

FIG. 16 is a schematic cross-sectional view of a main part of the linear guide apparatus shown in FIG. 15;

FIG. 17 is an enlarged perspective view of a major portion of a second guide member in the main part shown in FIG. 16;

FIG. 18 is a schematic cross-sectional view of a main part of a first modification of the linear guide apparatus shown in FIG. 15;

FIG. 19 is an enlarged perspective view of a major portion of a second guide member in the main part shown in FIG. 18;

FIG. 20 is a schematic cross-sectional view of a main part of a second modification of the linear guide apparatus shown in FIG. 15;

FIG. 21 is an enlarged perspective view of a major portion of a second guide member in the main part shown in FIG. 20;

FIG. 22 is a schematic cross-sectional view of a main part of a third modification of the linear guide apparatus shown in FIG. 15;

FIG. 23 is an enlarged perspective view of a major portion of a second guide member in the main part shown in FIG. 22;

FIG. 24 is a schematic cross-sectional view of a main part of a fourth modification of the linear guide apparatus shown in FIG. 15;

FIG. 25 is an enlarged perspective view of a major portion of a second guide member in the main part shown in FIG. 24;

FIG. 27A is a plan view schematically showing a position detection mechanism of a movable member in an optical pickup system using the linear guide apparatus shown in FIG. 26, in a state wherein the movable member and a stationary optical system are separated from each other;

FIG. 27B is a plan view schematically showing the position detection mechanism of the movable member in the optical pickup system using the linear guide apparatus shown in FIG. 26, in a state wherein the movable member and the stationary optical system are close to each other;

FIG. 27C is a circuit diagram showing an example wherein an adder is added to a differential signal detection circuit of the position detection mechanism of the movable member in the optical pickup system using the linear guide apparatus shown in FIG. 26;

FIG. 30 is a schematic perspective view of a main part of a linear guide apparatus according to a seventh embodiment of the present invention;

FIG. 31 is a schematic plan view of the main part of the linear guide apparatus shown in FIG. 30;

Several embodiments and modifications of the present invention will be described in detail with reference to the accompanying drawings.

DETAILED DESCRIPTION OF THE PREFERRED EMBODIMENTS

First Embodiment

In the following, a linear guide apparatus according to the first embodiment of the present invention will be explained in detail with reference to FIGS. 6 and 7.

Figure 6:
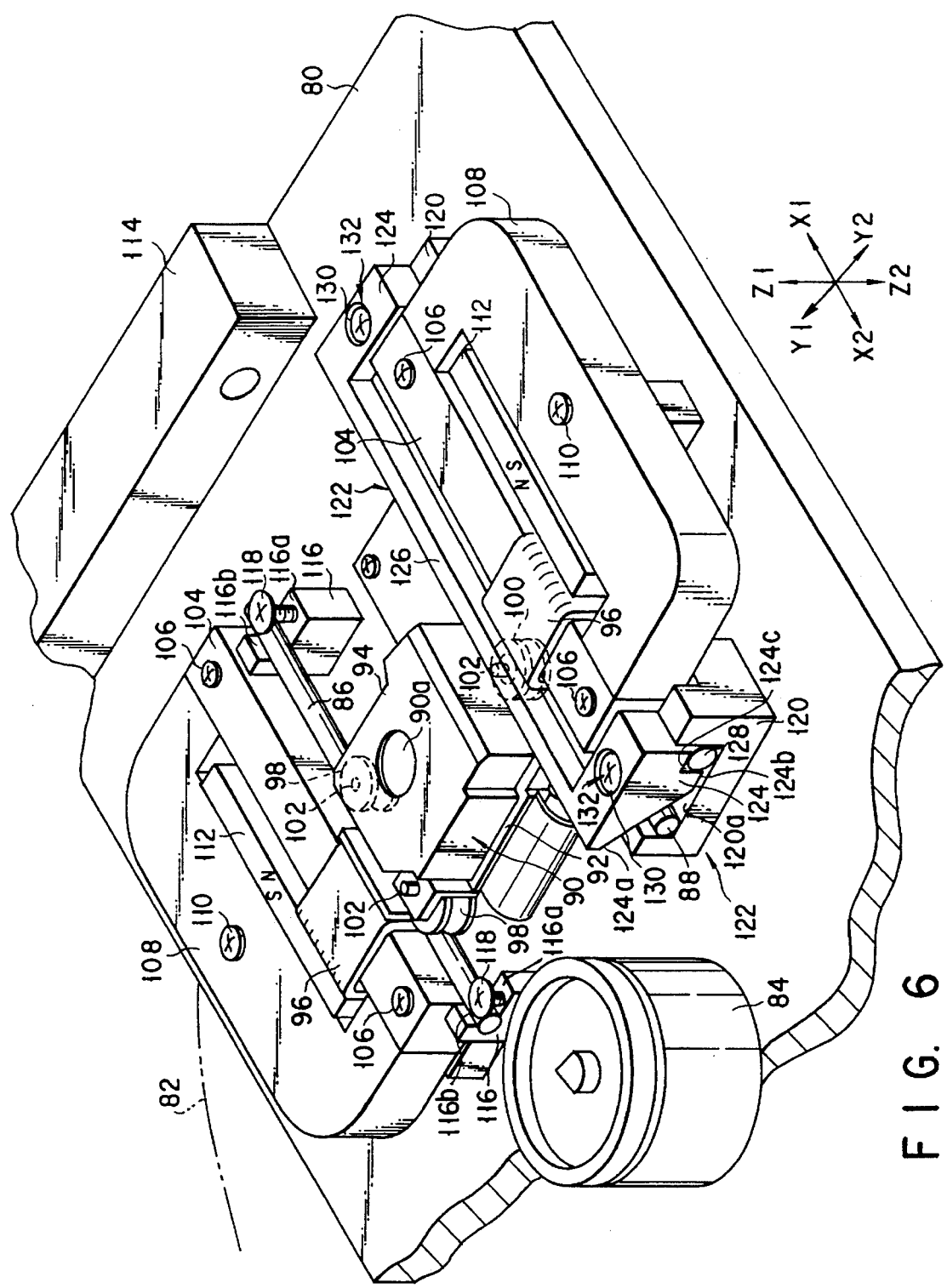
FIG. 6 is a schematic perspective view of a linear guide apparatus according to a first embodiment of the present invention.
Figure 7:
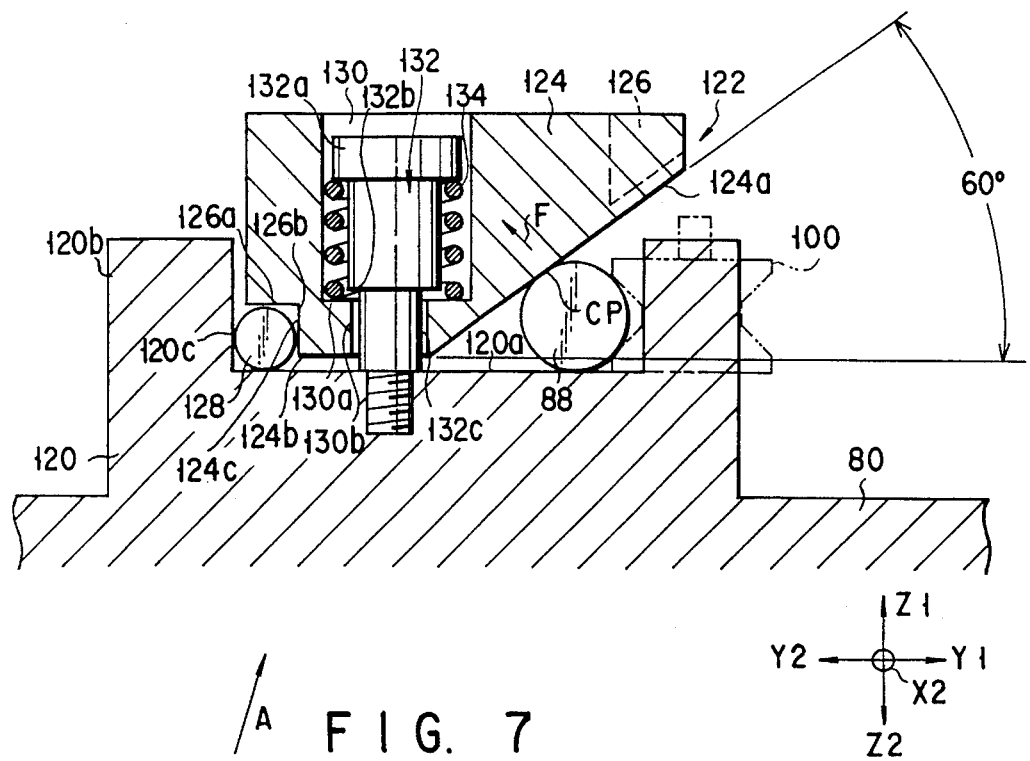
FIG. 7 is a schematic cross-sectional view of a main part of the linear guide apparatus shown in FIG. 6.

FIG. 6 is a schematic perspective view of an optical disc unit being provided with a linear guide apparatus according to the first embodiment of the present invention, and FIG. 7 is a cross sectional view of a main part of the linear guide apparatus shown in FIG. 6.

In the following description, a tracking direction along which a moving member supporting an optical head in the linear guide apparatus is moved in the radial direction of an optical disc is designated by arrows X1 and X2, a direction which is perpendicular to the tracking direction on a plane including the tracking direction is designated by arrows Y1 and Y2, and a focusing direction along a rotational center line of the optical disc is designated by arrows Z1 and Z2.

On a deck base 80 of the optical disc unit, a spindle motor 84 for rotating an optical disc 82 is fixed. A pair of first and second guide rails 86, 88 are mounted on the deck base 80 on a side of the spindle motor 84, and the guide rails 86, 88 extend in parallel to each other in the radial direction of the optical disc 82 on the spindle motor 84. The guide rails 86, 88 support a moving member 90 so that a movement of the moving member 90 is guided along the guide rails 86, 88.

The moving member 90 is provided with an objective lens 90a, a well known actuator (not shown) for moving the objective lens 90a by minute distance in the tracking direction designated by the arrows X1 and X2 and in the focusing direction designated by the arrows Z1 and Z2, a carriage 92 supporting the actuator, a cover 94 covering the actuator, and two access coils 96 fixed on both side surfaces of the carriage 92 located in the directions of the arrows Y1 and Y2.

Two first bearings 98, 98 each having a shape of door wheel are attached on a surface of the carriage 92 which faces in the direction designated by the arrow Y1, so that the first bearings 98, 98 are arranged to separate from each other in the tracking direction (designated by the arrows X1 and X2). And, a second bearing 100 having a shape of door wheel is attached on a surface of the carriage 92 which faces in the direction designated by the arrow Y2. These three first and second bearings 98, 98 and 100 are rotatably supported by three rotational center shafts 102 each having a rotational center line extending in the directions designated by the arrows Z1 and Z2.

The two first bearings 98, 98 and the second bearing 100 are supported by the first and second guide rails 86, 88 corresponding to the first bearings 98, 98 and the second bearing 100, with their radially inwardly curved circumferential surfaces being pressed on the corresponding first and second guide rails 86, 88, so that these first and second bearings 98, 98 and 100 function as guide receptacles which receive the first and second guide rails 86, 88 and cooperate with them. Therefore, the moving member 90 is movable along the first and second guide rails 86, 88 in the tracking direction (designated by the arrows X1 and X2) with no rattle.

Each of the two access coils 96 has a tubular square shape, and their center lines extend in the same directions as the extending directions of the paired first and second guide rails 86, 88. A pair of inner yokes 104, 104 extend along the first and second guide rails 86, 88 in parallel thereto on the outer sides thereof, pass through the center holes of the access coils 96, and are fixed on the upper surface of the deck base 80 by screws 106.

On the outer sides of the paired first and second guide rails 86, 86, a pair of outer yokes 108, 108 are arranged to produce a space between each of the outer yokes 108, 108 and the corresponding one of the inner yokes 104, 104. Both ends of each of the outer yokes 108, 108 arranged in the tracking direction (designated by the arrows X1 and X2) are bent toward both ends of the corresponding one of the inner yokes 104, 104 arranged in the tracking direction (designated by the arrows X1 and X2) and are abutted thereto. The outer yokes 108, 108 are fixed on the upper surface of the deck base 80 by screws 110. On the inner side surfaces of the paired outer yokes 108, 108, long and narrow magnets 112, 112 extending in the extending directions of the paired inner yokes 104, 104 are fixed to produce a magnetic gap between each of the magnets 112, 112 and the corresponding one of the inner yokes 104, 104, and a part of each of the access coils 96 passes through the corresponding one of the magnetic gaps.

With this arrangement, magnetic forces generated by the two access coils 96, 96 when electric current is supplied to the access coils 96, 96 act together with the magnetic fields in the magnetic gaps to drive the moving member 90 holding the two access coils 96, 96 in the tracking direction (designated by the arrows X1 and X2).

On the upper surface of the deck base 80, a stationary optical unit 114 including a laser emitting device and a photo detector, etc. both of which are not shown is further fixed. A laser beam emitted from the stationary optical unit 114 is projected on the objective lens 90a through a mirror(not shown) fixed on the moving member 90 and is focused on an information recording surface of the optical disc 82. The focused laser beam is used to record information thereon or is reflected from the information recording surface of the optical disc 82 toward the photo detector of the stationary optical unit 114 through the light path described above to reproduce information which has been recorded on the recording surface of the optical disc 82.

The both end portions of the first guide rail 86 in its longitudinal direction are rested on height datum surfaces 116a of a pair of fixing bases 116 formed on the upper surface of the deck base 80, and are abutted on side datum surfaces 116b formed on the fixing bases 116 to project in the upward direction designated by the arrow Z1 from the height datum surfaces 116a and facing in a direction designated by the arrow Y2. The both end portions of the first guide rail 86 are fixed to the corresponding fixing bases 116 by the heads of flush bolts 118 with the both end portions being abutted on the corresponding height datum surfaces 116a and side datum surfaces 116b of the fixing bases 116.

The both end portions of the second guide rail 88 in its longitudinal direction are rested on height datum surfaces 120a of a pair of fixing bases 120 formed on the upper surface of the deck base 80, and are held by pre-load adjusting means 122 to make a distance between the second guide rail 88 and the first guide rail 86 being changeable with them being in parallel to each other.

The pre-load adjusting means 122 has a pair of pre-load blocks 124 and a connecting member 126 connecting the paired pre-load blocks 124 to each other, and each of the pre-load blocks 124 has an inclined surface 124a pressing the corresponding one of the both end portions of the second guide rail 88 against the height datum surface 120a of the corresponding one of the fixing bases 120. And the inner yoke 104 corresponding to the paired pre-load blocks 124 is arranged between the paired pre-load blocks 124.

The pre-load adjusting means 122 is particularly shown in FIG. 7.

In each pre-load block 124, the inclined surface 124a is inclined at 60° to a bottom surface 124b facing in the direction designated by the arrow Z2. And, the lower surface of the connecting member 126 facing in the direction designated by the arrow Z2 is located above the inclined surfaces 124a of the pre-load blocks 124 in the direction designated by the arrow Z1.

A depressed portion 124c is formed in an end of the bottom surface 124b of the each pre-load block 124 located on a side opposite to the inclined surface 124a. The bottom surface of the depressed portion 124c is constituted by a height datum surface 126a facing in the direction designated by the arrow Z2 and a side datum surface 126b facing in the direction designated by the arrow Y2 and crossing the height datum surface 126a at right angles.

A cylindrical parallel pin 128 rested on the height datum surface 120a of the each fixing base 120 is seated on the height datum surface 126a and the side datum surface 126b of the depressed portion 124c of the corresponding pre-load block 124. A position determining projection 120b is formed on the height datum surface 120a of the each fixing base 120 and projects in the upward direction designated by the arrow Z1, and the parallel pin 128 is abutted against a side datum surface 120c facing in the direction designated by the arrow Y1 on the position determining projection 120b so that the parallel pin 128 is positioned in the directions designated by the arrows Y1 and Y2.

A stepped through hole 130 is formed in the each pre-load block 124 to pass from the upper surface of the pre-load block 124 to the lower surface thereof, and a two stepped screw 132 is inserted in the stepped through hole 130 to be rotatable therein. A tip end of the stepped screw 132 is screwed into the height datum surface 120a of the corresponding fixing base 120. A compression coil spring 134 is wound around the stepped screw 132 between a head 132a of the stepped screw 132 and a bottom surface 130a of the step of the stepped through hole 130.

The pre-load block 124 presses its inclined surface 124a and depressed portion 124c on the second guide rail 88 and the corresponding parallel pin 128, respectively, and in this state a gap is produced between the bottom surface of the corresponding pre-load block 124 and the height datum surface 120a of the corresponding fixing base 120. Further, the bottom surface 130a of the step of the stepped through hole 130 of the corresponding pre-load block 124 and an end surface 132b of the step of the the stepped screw 132 are abutted to each other when the pre-load block 124 is moved excessively in the upper direction designated by the arrow Z1, so that they function as a stop for preventing the pre-load block 124 from moving excessively in the upper direction.

A small gap is also produced between an inner peripheral surface 130b of a small diameter portion of the stepped through hole 130 and an outer peripheral surface 132c of a small diameter portion of the stepped screw 132, and these inner peripheral surface 130b and outer peripheral surface 132c are abutted to each other when the pre-load block 124 is moved excessively in the tracking direction (designated by the arrows X1 and X2) and the directions designated by the arrows Y1 and Y2, so that they function as a stop for preventing the pre-load block 124 from moving excessively in the above described directions.

When shock is applied to the optical disc apparatus from the outside thereof, these stops effectively prevent the pre-load block 124 and the second guide rail 88 from moving excessively not to be returnable.

Next, an action of the pre-load adjusting means 122 will be explained.

The pre-load block 124 abutting the inclined surface 124a on the second guide rail 88 by the urging force of the compression coil spring 134 presses the second guide rail 88 toward the height datum surfaces 120a of the fixing bases 120 and in the direction designated by the arrow Y1 (that is, toward the first guide member 86), so that the second guide rail 88 is pressed on the outer peripheral surface of the corresponding second bearing 100.

Although there are tolerance of the distance in the directions designated by the arrows Y1 and Y2 between the first bearings 88 and the second bearing 100 on the both side surfaces of the moving direction 90, and tolerances of the distances between the height and side datum surfaces 126a and 126b of the depressed portion 124c of the each pre-load block 124 and the inclined surface 124a thereof, the first and second bearings 98, 98, and 100 are prevented from generating rattle on the first and second guide rails 86, 88 by the rotation of the each pre-load block 124 around the X axis under the urging force of the compression coil spring 134 with the each parallel pin 128 functioning as the rotational point for the each pre-load block 124.

Further, in the each pre-load block 124, the height datum surface 126a of the depressed portion 124c, the bottom surface 130a of the stepped portion of the through hole 130, and a contact point CP of the inclined surface 124a to the second guide rail 88 are defined to have their positional relationships between them in the height direction designated by the arrows Z1 and Z2 as follow: height datum surface 126a<bottom surface 130a<contact point CP.

That is, since the bottom surface 130a of the stepped portion of the through hole 130 on which the compression coil spring 134 for pressing downward the pre-load block 124 is located between the contact point CP and the height datum surface 126a functioning as a rotational support of the pre-load block 124 on the parallel pin 128, a component of force in the direction designated by the arrow Y2 in a reaction force F generated in the second guide rail 88 and pressing back the inclined surface 124a of the pre-load block 124 and the urging force of the compression coil spring 134 pressing the bottom surface 130a of the stepped portion of the through hole 130 in the downward direction designated by the arrow Z1 press the each parallel pin 128 toward the height datum surface 120a of the corresponding fixing base 120 through the height datum surface 126a of the depressed portion 124c of the corresponding pre-load block 124, and press the each parallel pin 128 toward the side datum surface 120c of the position determining projection 120b of the corresponding fixing base 120 through the side datum surface 126b of the depressed portion 124c.

Therefore, the each pre-load block 124 rotates on the corresponding parallel pin 128 which is always located at the predetermined position on the height datum surface 120a of the corresponding fixing base 120. That is, the each pre-load block 124 always presses the second guide rail 88 stably.

In this embodiment, the each parallel pin 128 is a fixing projection mounted on the deck base 80 and constituting a rotational support which cooperates with the depressed portion 124c to rotatably support the corresponding pre-load block 124.

The pre-load blocks 124 and the connecting member 126 of this embodiment are formed by the lost wax process, and the height and side datum surfaces 126a and 126b of the depressed portion 124c and the inclined surface 124a are polished. Therefore, high precision of these three surfaces can be achieved by the polishing work, and if these three surfaces are damaged, the damage can be repaired easily.

The above described three surfaces 126a, 126b, and 124a are formed at one time in the direction designated by the arrow Z1 in FIG. 7 by one grind stone three parts of which have cross sections corresponding to the cross sections of the three surfaces. As a result of this, positional accuracy between the three surfaces can be increased. Even if the three surfaces are machined by milling, these surfaces can be formed in the direction designated by the arrow Z1 in FIG. 7, so that the positional accuracy between the three surfaces can be increased.

Figure 1:
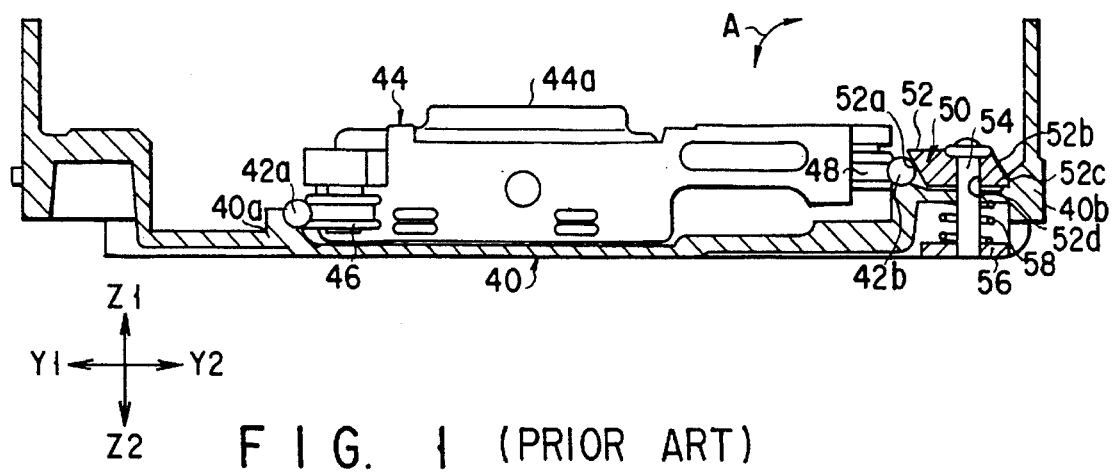
FIG. 1 is a schematic cross-sectional view of a conventional linear guide apparatus.
Figure 2:
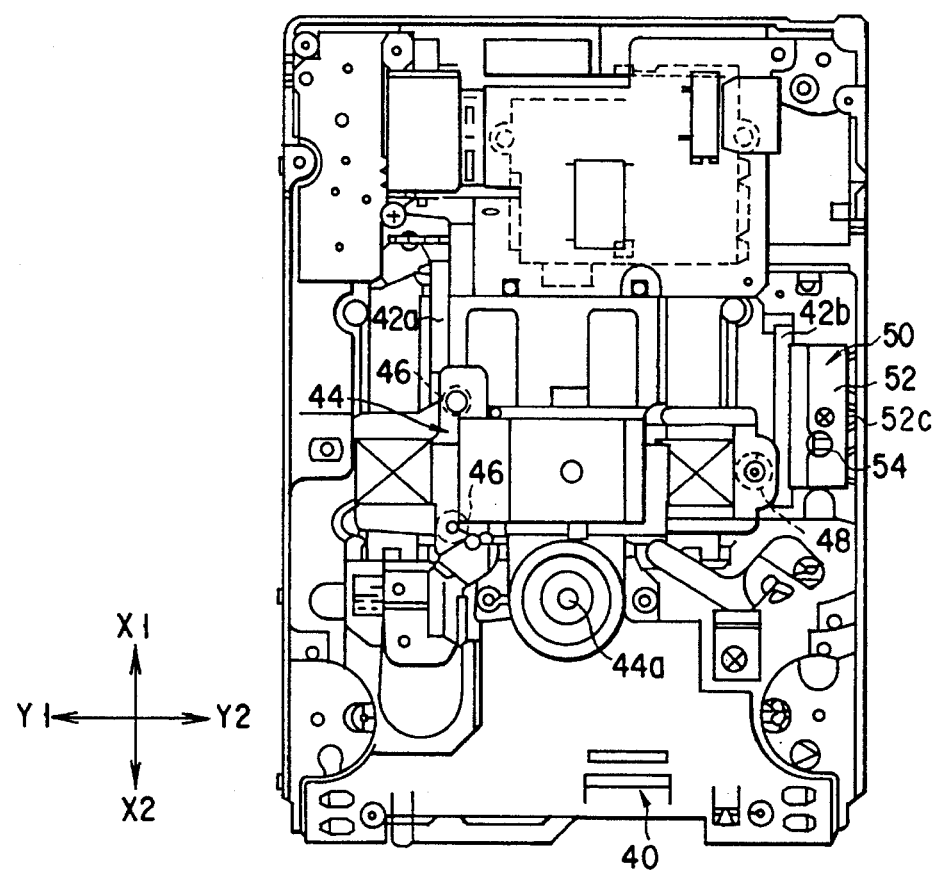
FIG. 2 is a schematic plan view of the linear guide apparatus shown in FIG. 1.
Figure 3:
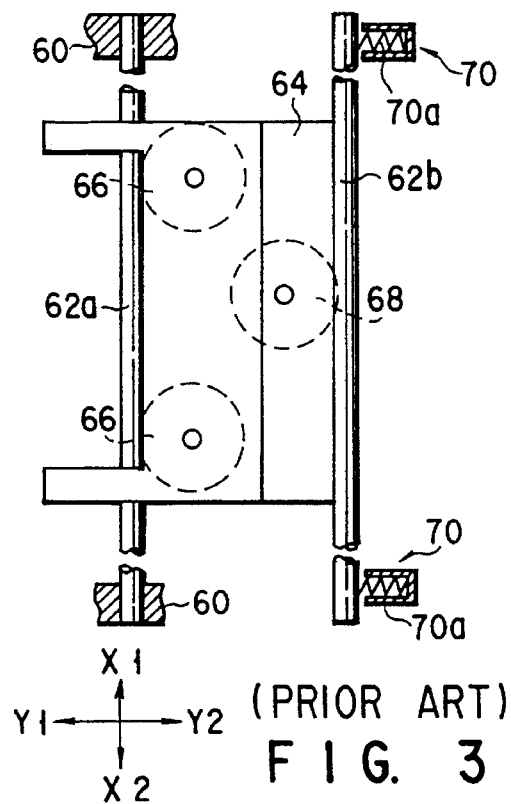
FIG. 3 is a schematic plan view of another conventional linear guide apparatus.
Figure 4:
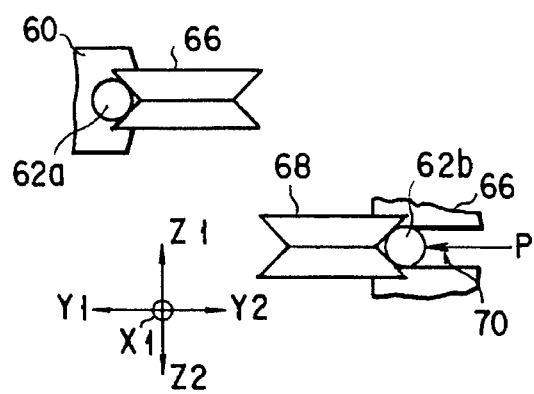
FIG. 4 is a schematic cross-sectional view of the main part of the linear guide apparatus shown in FIG. 3.
Figure 5:
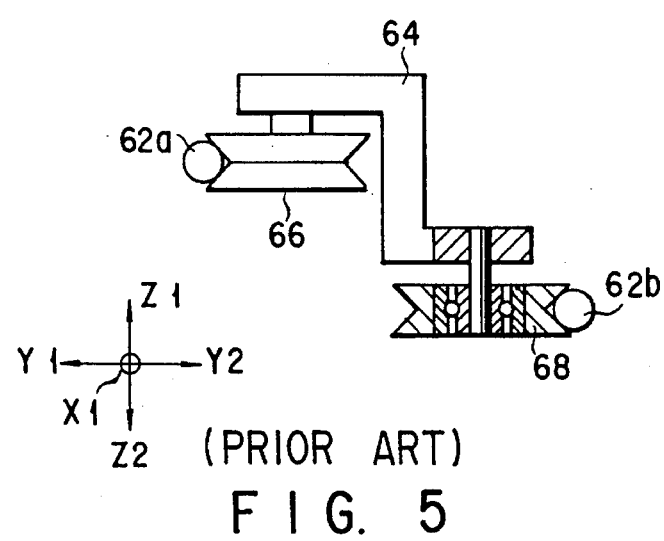
FIG. 5 is another schematic cross-sectional view of the main part of the linear guide apparatus shown in FIG. 3.

Further, if a mold which can be splitted into two pieces in the direction designated by the arrow A in FIG. 1 and in the direction opposite to the arrow A direction is used when the pre-loading block 124 is formed by molding of plastic material such as glass fiber reinforced PPS, etc. or by die-casting of zinc, all of the three surfaces can be engraved only in one of the pieces, so that the positional accuracy between the three surfaces can be increased.

More further, since the cylindrical member can be formed easily at low cost with particularly high accuracy, the degree of parallel between the first and second guide rails 86, 88 and the positional accuracy of the second guide rail 88 can be increased. And, since the side datum surface 120c of the fixed base 120, is formed continuously with the height datum surface 120a on which both the second guide rail 88 and the parallel pin 128 are rested, the positional accuracy between the second guide rail 88 and the parallel pin 128 are increased. In this embodiment, in order to prevent the each parallel pin 128 from removing out from its predetermined position shown in FIG. 7 on the corresponding fixing base 120 in the tracking direction (designated by the arrows X1 and X2), removing prevent projections can be formed at two positions which are located adjacent to the both ends of the each parallel pin 128 in the tracking direction (designated by the arrows X1 and X2) and facing to the both ends.

Further, both of the pair of parallel pins 128 corresponding to the pair of fixing bases 120 or either one of them can be replaced with balls or a ball. Since the ball can be formed at low cost with particularly high accuracy as in the case of the cylindrical member, the same function and technical advantage as in the case in which the cylindrical member is used can be obtained. And, if the deck base 80 is formed by injection molding of plastic material, etc., the pair of parallel pins 128 can be integrally formed with the deck base 80 at the same time when the deck base 80 is formed by injection molding.

First Modification of The First Embodiment

Figure 8:
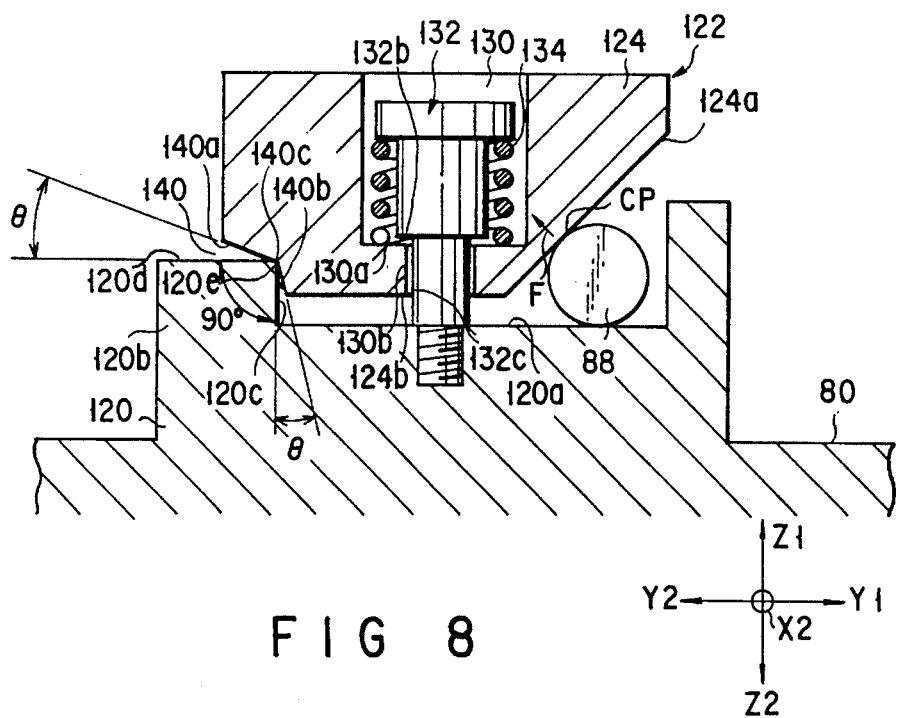
FIG. 8 is a schematic cross-sectional view of a main part of a first modification of the linear guide apparatus shown in FIG. 6.

FIG. 8 is a schematic cross-sectional view of a main part of a first modification of the linear guide apparatus of the first embodiment described above. In this first modification, the same structural members as those of the first embodiment are designated by the same reference numerals as those used to designate the latter structural members.

In this first modification, by abutting a recessed portion 140 formed in the pre-loading block 124 against a corner of the position determining projection 120b of the fixing base 120 formed on the upper surface of the deck base 80 and pointing to the direction designated by the arrow Z1, the corner acts as a rotation support for the pre-loading block 124.

The deck base 80 is formed by die-casting of aluminum, the upper surface of the position determining projection 120b of the fixing base 120 facing in the direction designated by the arrow Z1, is machined as a height datum surface 120d which crosses the side datum surface 120b with an angle of 90 degrees, and a cross line of of the height datum surface 120d and the side datum surface 120c of the position determining projection 120b which faces the recessed portion 140 of the pre-loading block 124 forms a ridge 120e.

A bottom surface of the recessed portion 140 of the pre-loading block 124 of this modification is consisted of two datum surfaces 140a, 140b which crosses each other with an obtuse angle, and the ridge 120e of the position determining projection 120b of the each fixing base 120 abuts against a corner 140c between the two datum surfaces 140a, 140b of the each pre-loading block 124. The height datum surface 120d and the side datum surface 120c of the position determining projection 120b face one datum surface 140a, facing downwardly and designated by the arrow Z2, and the other datum surface 140b, facing sidewardly and designated by the arrow Y2, with a minute angle, respectively, and it is preferably that the minute angle is in a range between about 3 degrees and about 10 degrees.

In this modification, a positional relationship between the ridge 120e of the position determining projection 120b of the fixing base 120 which functions as a rotational center of the pre-loading block 124, the end surface 130a of the step of the through hole 130 on which the resilient force of the compression coil spring 134 is applied, and the contact point CP of the second guide rail 88 to the inclined surface 124a, in the height direction (designated by the arrows Z1 and Z2) is so set that the height of each of the ridge 120e, the end surface 130a, and the contact point CP becomes larger in this order. Therefore, as in the first embodiment described above with reference to FIGS. 6 and 7, the pre-loading block 124 is rotatable in such a condition that the abutment of the corner 140c of the recessed portion 140 of the pre-loading block 124 to the ridge 120e of the position determining projection 120b of the fixing base 120 is kept always.

In this modification, as in the the first embodiment, the two datum surfaces 140a, 140b (that is, the corner 140c) of the recessed portion 140 and the inclined surface 124a of the pre-loading block 124 can be ground at one time. And, when the pre-loading block 124 is formed by one-piece molding, a split type mold as one used in the first embodiment can be used, and the above described three surfaces (two datum surfaces 140a, 140b, and inclined surface 124a) can be engraved in one piece of the mold so that the accuracy of the positional relation ship between these three surfaces can be improved. Further, since this modification need not to use the parallel pins 128 of the first embodiment, the number of the structural elements of this modification is smaller than that of the first embodiment.

Second Modification of the First Embodiment

Figure 9:
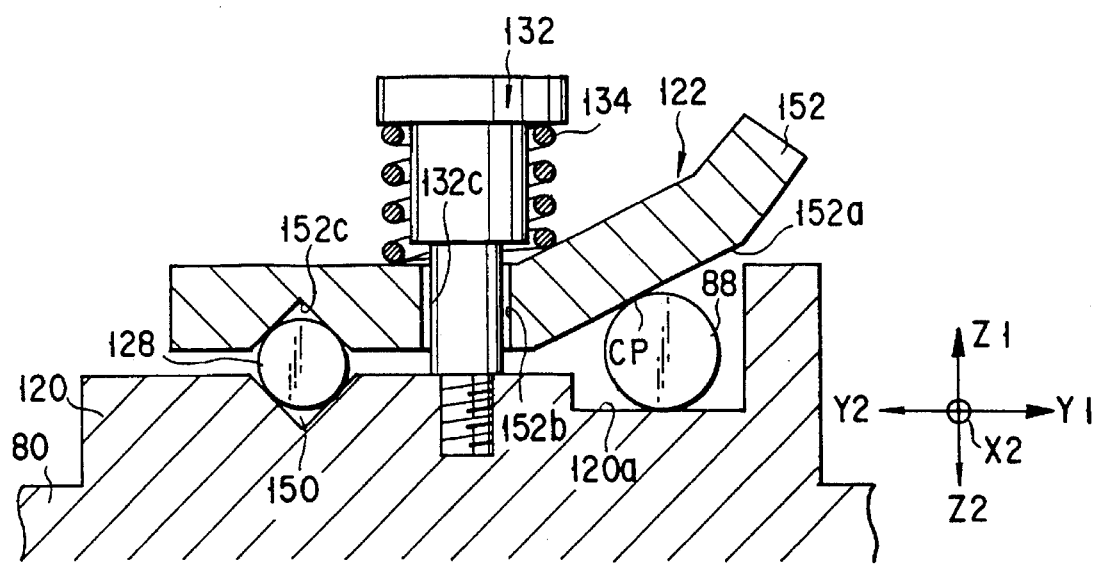
FIG. 9 is a schematic cross-sectional view of a main part of a second modification of the linear guide apparatus shown in FIG. 6.
Figure 10:
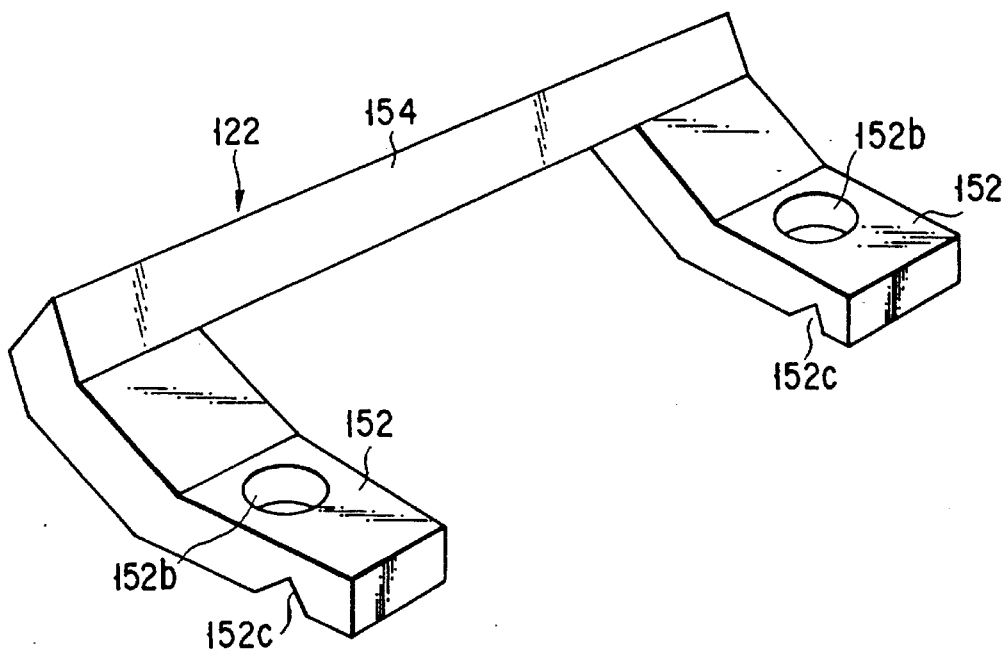
FIG. 10 is an enlarged perspective view of a pre-load block of the second modification shown in FIG. 9.

FIG. 9 is a schematic cross sectional view of a main portion of a second modification of the linear guide apparatus of the above described first embodiment, and FIG. 10 is a perspective view of a main portion of pre-load controlling means of the second modification in FIG. 9. In the second modification, the structural members of the second modification which are the same as those of the first embodiment are designated by the reference numerals which are used to designate the same structural members of the first embodiment, and the detailed descriptions thereof are omitted.

In this modification, a position determining groove 150 is formed in the height datum surface 120a of the each fixing base 120 formed on the deck base 80, at a position separated from the second guide rail 80 in the direction designated by the arrow Y2. The position determining groove 150 extends in the tracking direction (designated by the arrows X1 and X2) and has a V-shaped cross section.

The pre-load adjusting means 122 comprises a pair of pre-load blocks 152, 152 which correspond to the both longitudinal ends of the second guide rail 88, and a connecting member 154 which connect the two pre-load blocks 152, 152 to each other. And, the pair of pre-load blocks 152, 152 and the connecting member 154 are formed by subjecting a stainless steel to a press work.

An inclined surface 152a of the each pre-load block 152 which abuts the second guide rail 88 is formed by bending an end portion of the each pre-load block 152 which is located in the connecting member side thereof, upward as designated by the arrow Z1. A through hole 152b is formed in the end of the flat portion of the each pre-load block 152 which is located in the upwardly bending portion thereof, and the stepped screw 132 is inserted into the through hole 152b and is screwed into the height datum surface 120a of the fixing base 120. The diameter of the through hole 152b is smaller than that of the large diameter portion of the stepped screw 132, and is larger than that of the small diameter portion thereof.

A position determining depression 152c is formed in the lower surface of the each pre-load block 152 at a position which faces the position determining groove 150 of the corresponding fixing base 120, and extends in the tracking direction (designated by the arrows X1 and X2). The position determining depression 152c has a V-shaped cross section, and are subjected to the grinding work at the same time when the inclined surface 152c is grinned.

A parallel pin 128 is sandwiched between the position determining depression 152c of the each pre-load block 152 and the position determining groove 150 of the corresponding fixing base 120, and the each pre-load block 152 is rotatable around the parallel pin 128.

The remaining structure of the second modification is the same as that of the first embodiment, and the operation and function thereof resulting from the remaining structures are the same as those of the first embodiment.

With the structure of the second modification, the grinding work of the position determining depression 152c of the each pre-load block 152 having the V-shaped cross section is easier than that of the depressed portion 124c of the pre-load block 124 of the first embodiment. And, since the position determining depression 152c and the inclined surface 152a can be formed by the press work at one time in the same direction, the positional accuracy between the bottom surface of the position determining depression 152c and the inclined surface 152a. Further, since the pre-load block 152 can be formed of the stainless steel plate through the press work, the machining cost is low.

In the second modification, both or either one of the pair of the parallel pins 128 sandwiched between the position determining grooves 150 of the pair of fixing bases 120 and the position determining depressions 152c of the pair of the pre-load blocks 152 can be replaced with balls or a ball.

Second Embodiment

FIG. 11 is a schematic cross sectional view of a main portion of a linear guide apparatus of a second embodiment of this invention.

The main part of the structural members of this embodiment is the same as that of the second modification of the first embodiment described above with reference to FIGS. 9 and 10. Therefore, the structural members of this embodiment which are the same as those of the second modification are designated by the reference numerals which are used to designate the same structural members of the second modification, and the detailed descriptions thereof are omitted.

In the pre-load block 152 of this embodiment, in place of the position determining depression 152c of the pre-load block 152 of the above described second modification, a position determining projection 152d is formed by a press work, and the position determining projection 152d projects downwardly as designated by the arrow Z2 and extends in the tracking direction (designated by the arrows X1 and X2). The position determining projection 152d is seated on the position determining groove 150c formed in the height datum surface 120a and having the V-shaped cross section, and services as a rotational center of the corresponding pre-load block 152. The remaining structural members of the second embodiment are the same as those of the remaining structural members of the second modification of the first embodiment described above with reference to FIGS. 9 and 10.

Since this embodiment need not the parallel pin 128 sandwiched between the each pre-load block 152 and the height datum surface 120a of the corresponding fixing base 120 in the above described second modification, the number of the structural members of this embodiment is smaller than that of the second modification. And, the position determining projection 152d can be formed easily with high accuracy. Further, the operation and function thereof resulting from the remaining structures are the same as those of the first embodiment and the second modification.

Third Modification of the First Embodiment

FIG. 12 is a schematic cross sectional view of a main portion of a linear guide apparatus of a third modification of the first embodiment.

The main part of the structural members of this modification is the same as that of the second modification of the first embodiment described above with reference to FIGS. 9 and 10. Therefore, the structural members of this modification which are the same as those of the second modification are designated by the reference numerals which are used to designate the same structural members of the second modification, and the detailed descriptions thereof are omitted.

In the height datum surface 120a of the fixing base 120 of this modification, in place of the position determining groove 150c of the height datum surface 120a of the above described second modification, a position determining projection 160 is formed. The position determining projection 160 has an inverted V-shaped cross section, projects upwardly as designated by the arrow Z1, and extends in the tracking direction (designated by the arrows X1 and X2).

The opening angle of the position determining groove 150c of the each pre-load block 152 is so set that it is larger than that of the position determining projection 160.

The corner of the position determining depression 152c of the each pre-load block 152 is seated on the tip end of the position determining projection 160 of the corresponding fixing base 120, and the position determining projection 160 services as a rotational center of the corresponding pre-load block 152.

The remaining structural members of the third modification are the same as those of the remaining structural members of the second modification of the first embodiment described above with reference to FIGS. 9 and 10, and the technical effects which are the same as those resulting from the second modification can be enjoyed in the third modification. And, the position determining projection 160 can be formed easily with high accuracy. Further, this modification need not to use the parallel pin 128 used in the above described second modification.

Third Embodiment

Figure 13:
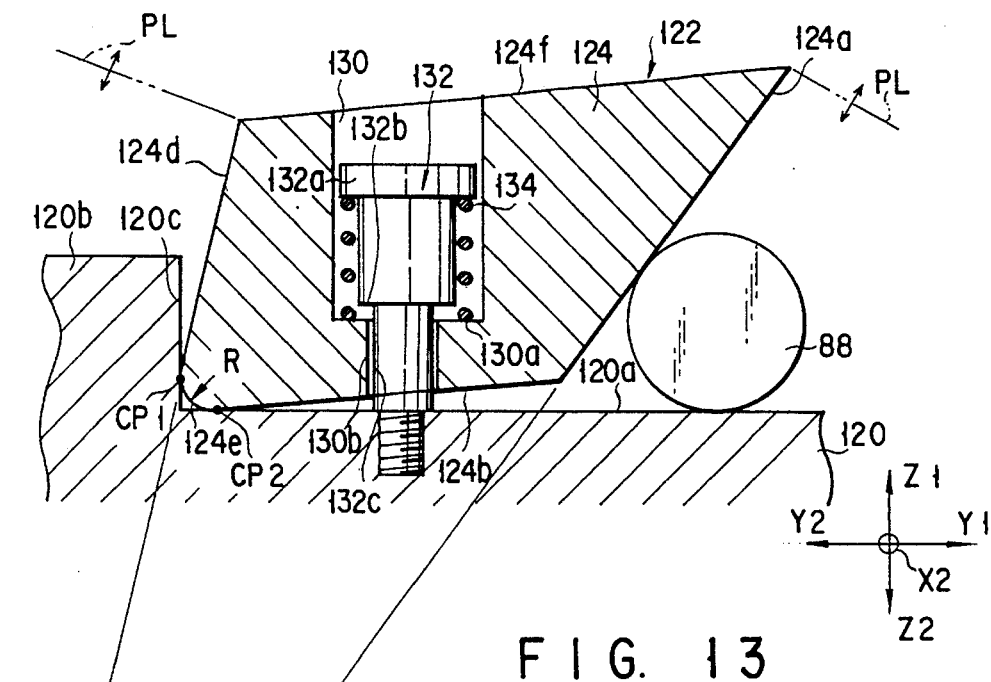
FIG. 13 is a schematic cross-sectional view of a main part of a linear guide apparatus according to a third embodiment of the present invention.

FIG. 13 is a schematic cross sectional view of a main portion of a linear guide apparatus of a third embodiment of this invention.

The main part of the structural members of this embodiment is the same as that of the first embodiment described above with reference to FIGS. 6 and 7, therefore, the structural members of this embodiment which are the same as those of the first embodiment are designated by the reference numerals which are used to designate the same structural members of the first embodiment, and the detailed descriptions thereof are omitted.

In this embodiment, in place of the rotational center which is produced by the combination of the parallel pin 128 arranged at the corner of the height datum surface 120a of the each fixing base 120 and the side datum surface 120c of the corresponding position determining projection 120b thereof, with the corner between the height datum surface 126a and the side datum surface 126b in the depressed portion 124c of the corresponding pre-load block 124, a new rotational center for the each pre-load block 124 on the corresponding fixing base 120 is employed.

The new rotational center is produced by the combination of the corner of the height datum surface 120a of the each fixing base 120 and the side datum surface 120c of the corresponding position determining projection 120b thereof, with a projection 124e produced between the bottom surface 124b of the each pre-load block 124 and an inclined back surface 124d thereof which faces in the direction designated by the arrow Y2 and located on the opposite side of the inclined surface 124a.

The bottom surface 124b of the each pre-load block 124 and the inclined back surface 124d thereof cross each other with an acute angle, and the cross section of the projection 124e is a partial cylindrical shape having a radius R of about 0.05 mm to about 1 mm. In this embodiment, an extension line of the back surface 124d of the pre-load block 124 and an extension line of the inclined surface 124a cross each other with an acute angle, and it is preferable that the acute angle is about 2 degrees to about 45 degrees. Further, in this embodiment, the bottom surface 124b of the pre-load block 124 which crosses the inclined surface 124a and the inclined back surface 124d thereof also crosses the inclined back surface 124d with an acute angle.

Since the projection 124e of the each pre-load block 124 which has the partial cylindrical cross sectional shape having a radius R always abut at two positions CP1 and CP2 of its outer peripheral surface on the height datum surface 120a and the side datum surface 120c of the corresponding fixing base 120, the projection 124e of the each pre-load block 124 is not crushed when an impact is applied to the corresponding pre-load block 124 and the corresponding fixing base 120, whereby the projection 124e of the each pre-load block 124 is prevented from sticking on the corner between the height datum surface 120a of the corresponding fixing base 120 and the side datum surface 120c thereof.

The each pre-load block 124 of this embodiment is formed by an injection molding of a plastic material. And, by structuring the mold used in the injection molding such that, as shown in FIG. 13, its partition line PL includes an upper surface 124f of the corresponding pre-load block 124 and extends out from both border lines between the upper surface 124f and each of the back surface 124d and the inclined surface 134a not to include the back surface 124d and the inclined surface 134a, the projection 124e, the back surface 124d and the inclined surface 134a of the corresponding pre-load block 124 can be formed by the same depressed portion in the same half piece of the mold. Therefore, the projection 124e, the back surface 124d and the inclined surface 134a of the corresponding pre-load block 124 can be formed with a high accuracy.

Fourth Embodiment

Figure 14:
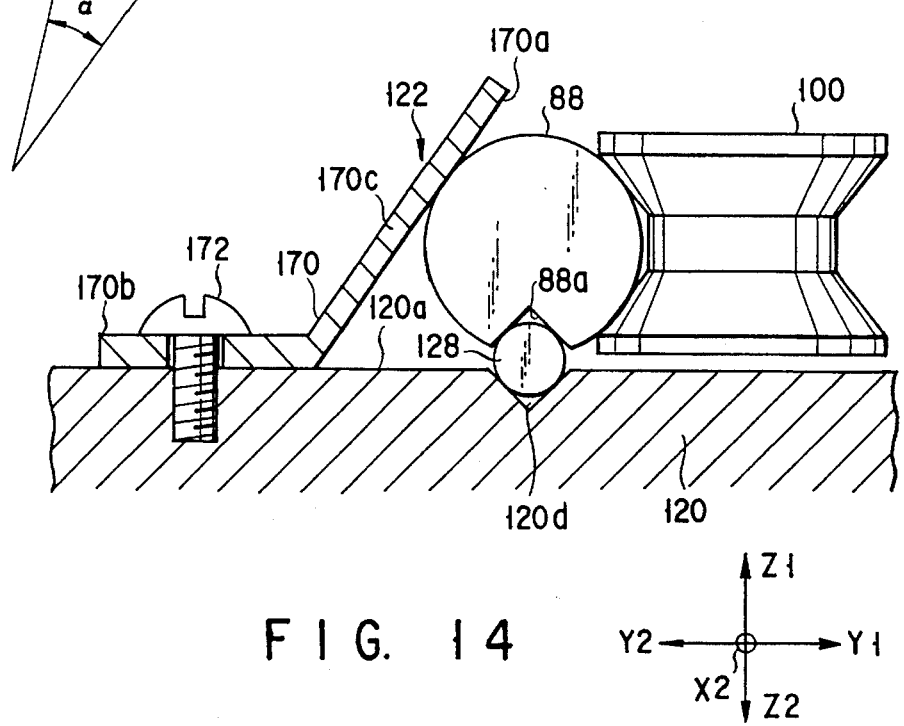
FIG. 14 is a schematic cross-sectional view of a main part of a linear guide apparatus according to a fourth embodiment of the present invention.

FIG. 14 is a schematic cross sectional view of a main portion of a linear guide apparatus of a fourth embodiment of this invention.

The structural members of this embodiment which are the same as those of the first embodiment described above with reference to FIGS. 6 and 7 are designated by the reference numerals which are used to designate the same structural members of the first embodiment, and the detailed descriptions thereof are omitted.

In this embodiment, a depressed portion 88a is formed in a region of the outer peripheral surface of the second guide rail (guide member) 88 which faces the height datum surface 120a of the each fixing base 120, and the depressed portion 88a has an inverted V-shaped cross section and extends along the longitudinal direction of the second guide rail 88. The depth of the depressed portion 88a is smaller than that of the radius of the second guide rail 88.

A position determining depression 120d is formed in a region of the height datum surface 120a of the each fixing base 120 which faces the depressed portion 88a of the second guide rail (guide member) 88. The position determining depression 120d has a V-shaped cross section and extends along the longitudinal direction of the second guide rail (guide member) 88. The cylindrical parallel pin 128 is seated in the position determining depression 120d, and the depressed portion 88a of the second guide rail 88 is seated on the cylindrical parallel pin 128. The parallel pin 128 forms a fixed or stable projection which functions as a rotational center for the second guide rail 88.

A resilient block 170 which has an inclined surface 170a is fixed on the height datum surface 120a of the each fixing base 120 at a side of each longitudinal end portion of the second guide rail 88, and the resilient block 170 presses at its inclined surface 170a the corresponding longitudinal end portion of the second guide rail 88 in a direction toward the parallel pin 128 and in a direction toward the second bearing (guide receptacle) of moving member 90 (FIG. 6). The resilient block 170 is formed by bending a plate like spring material to have a substantial V-shape cross section. And, one piece 170b of the resilient block 170 is fixed on the height datum surface 120a of the corresponding fixing base 120 by a screw 172, and the other piece 170c thereof extends from the height datum surface 120a in the upward direction designated by the arrow Z1 and in the sideward direction designated by the arrow Y1 (that is, a direction toward the second bearing 100) and forms the inclined surface 170a.

The other piece 170c of the resilient block 170 always urges the second guide rail 88 in the direction toward the second bearing 100 as designated by the arrow Y1.

The resilient block 170 having the above described structure can be formed easily. And, the depressed portion 88a of the second guide rail (guide member) 88 having the inverted V-shape cross section, the position determining depression 120d of the height datum surface 120a of the fixing base 120 having the V-shape cross section, and the parallel pin 128 are formed with high accuracy.

The parallel pin 128 of this embodiment may not be formed independently of the second guide rail 88 and the fixing base 120, but may be formed integrally with the second guide rail 88 or the height datum surface 120a of the corresponding fixing base 120. In this case, the number of the structural members can be smaller than that of this embodiment.

Fifth Embodiment

Figure 15:
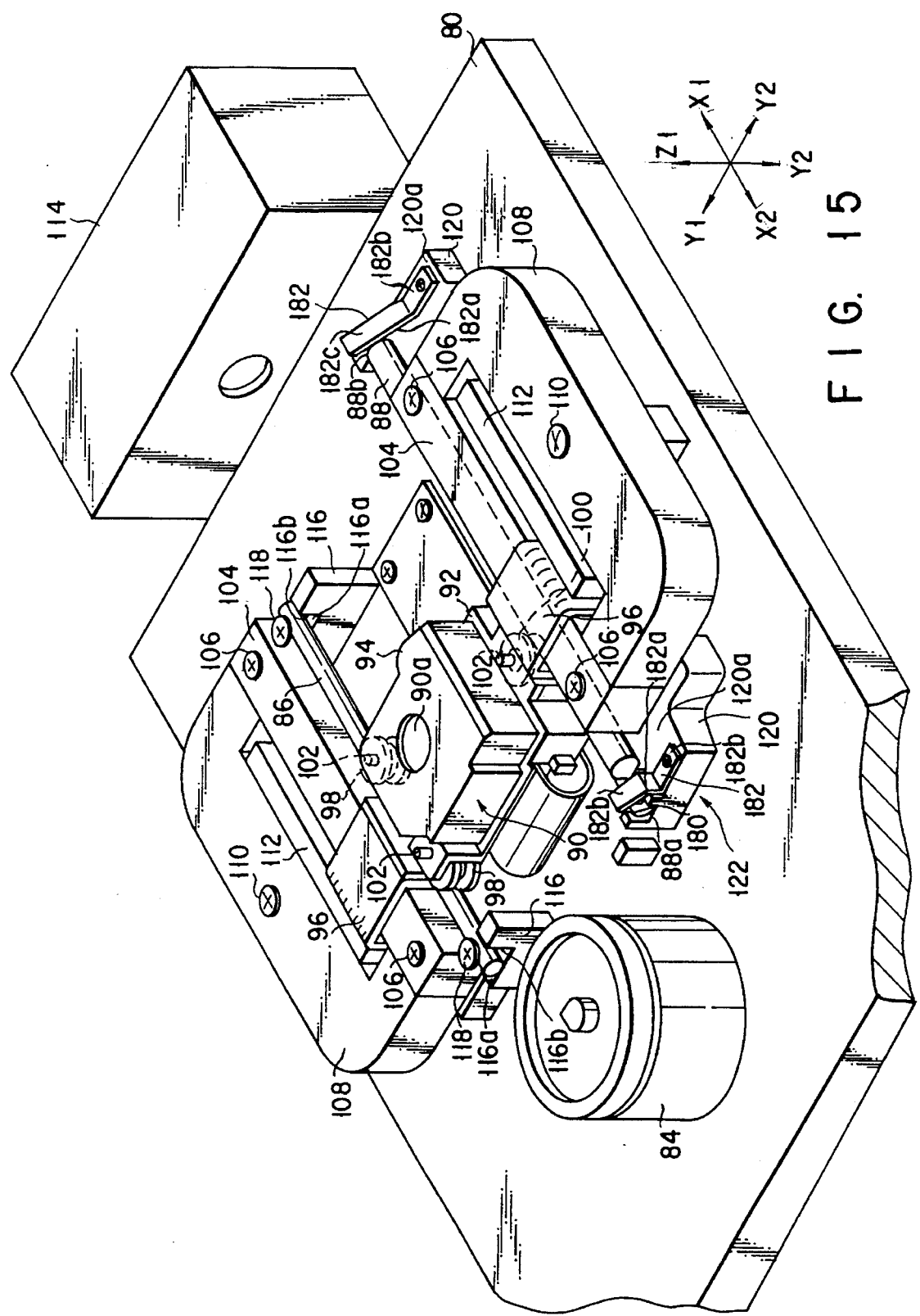
FIG. 15 is a schematic perspective view of a linear guide apparatus according to a fifth embodiment of the present invention.

FIG. 15 is a schematic perspective view of a linear guide apparatus of a fifth embodiment of this invention, FIG. 16 is a schematic cross sectional view of a main portion of the linear guide apparatus in FIG. 15, and FIG. 17 is a perspective view showing one end portion of a second guide rail (guide member) in the main portion of the linear guide apparatus in FIG. 16 in an enlarged scale, the one end portion being located in the longitudinal direction of the second guide rail and being an important portion.

The structural members of this embodiment which are the same as those of the first embodiment described above with reference to FIGS. 6 and 7 are designated by the reference numerals which are used to designate the same structural members of the first embodiment, and the detailed descriptions thereof are omitted.

A periphery of a cross section of each of longitudinal both end portions 88a, 88b of the second guide rail (guide member) 88 of this embodiment is formed, as shown in FIGS. 15, 16, and 17, by a combination of an arc with a straight line which is connected to the both ends of the arc, and the arc is a part of a circular periphery of the second guide rail 88 excluding the both ends.

A fixed projection 180 is formed in the height datum surface 120b of each of the fixing bases 120 on which the both end portions 88a, 88b of the second guide rail 88 are placed, and projects in a direction designated by the arrow Z1. A lower end of the arc in the cross section of each of the both end portions 88a, 88b of the second guide rail 88 is engaged with a corner 180b between the height datum surface 120a of the corresponding fixing base 120 and a side datum surface 180a of the corresponding fixed projection 180 which faces in a direction designated by the arrow Y1. And, an upper end of the arc in the cross section of each of the both end portions 88a, 88b abuts against an inclined surface 182a of a resilient block 182, the resilient block 182 being fixed on the height datum surface 120a of the each fixing base 120.

That is, each of the both end portions 88a, 88b of the second guide rail 88 functions as an engaging projection which engages with the fixed projection 180 of the height datum surface 120a of the each fixing base 120, and engages at its two positions spaced apart from each other, with the inclined surface 182a of the corresponding resilient block 182 and the height datum surface 120a of the corresponding fixing base 120.

If it is thought that the fixed projection 180 of the each fixing base 120 is engaging means, each of the both end portions 88a, 88b of the second guide rail 88 which engages with the corresponding fixed projection 180 is thought as engaged means.

The resilient block 182 is formed by bending a spring plate. And, a flat one end portion 182b of the resilient block 182 is fixed on the height datum surface 120a of the corresponding fixing base 120, and the other end portion 182c which extends from the corresponding height datum surface 120a in the upward direction designated by the arrow Z1 and in the sideward direction (that is, the direction toward the second bearing 100) designated by the arrow Y1 forms an inclined surface 182a.

The other end portion 182c of the resilient block 182 abuts at its inclined surface 182a an upper end of the corresponding one of the both end portions 88a, 88b of the second guide rail 88, and urges by its resilience the upper end in the direction (the direction toward the second bearing 100) designated by the arrow Y1 whereby the periphery of the second guide rail 88 excluding the both end portions 88a, 88b is pressed on the second bearing 100.

In this embodiment, upper and lower edges of the upper and lower ends of the arc in the cross section of each of the end portions 88a, 88b extend in the longitudinal direction of the second guide rail 88 to be in parallel to each other, and upper and lower edges of the arc in the cross section of one end portion 88a and those of the arc in the cross section of the other end portion 88b are symmetrical with each other.

With this arrangement, since the both end portions 88a, 88b are pressed by the inclined surfaces 182a of the other end portions 182c of the pair of the resilient blocks 182 abuts at its inclined surface 182a with the resilient forces of the same value, the both end portions 88a, 88b are always moved in directions designated by the arrows Y1 and Y2, by the same distance as to each other in response to a force applied from the second bearing 100, with the second guide rail 88 being kept in parallel to the first guide rail 86.

First Modification of the Fifth Embodiment

FIG. 18 is a schematic cross sectional view of a main portion of a first modification of the linear guide apparatus of the fifth embodiment shown in FIG. 15, and FIG. 19 is a perspective view showing one end portion of a second guide rail (guide member) in the main portion of the first modification of the linear guide apparatus in FIG. 18 in an enlarged scale, the one end portion being located in the longitudinal direction of the second guide rail and being an important portion.

The structural members of this modification which are the same as those of the fifth embodiment described above with reference to FIGS. 15 to 17 are designated by the reference numerals which are used to designate the same structural members of the fifth embodiment, and the detailed descriptions thereof are omitted.

In this modification, an engaging projection 190 is formed on each of the both ends of the second guide rail 88 in the longitudinal direction thereof. And, the engaging projections 190 are eccentric with the longitudinal center line of the second guide rail 88, and project from the both ends along the longitudinal direction of the second guide rail 88. The engaging projections 190 on the both longitudinal ends of the second guide rail 88 are concentric with each other, and each of the engaging projections 190 has a cylindrical shape.

The each engaging projection 190 of the second guide rail 88 abuts against a corner between the height datum surface 120a of the corresponding fixing base 120 and the side datum surface 180b of the fixed projection 180 formed on the height datum surface 120a of the corresponding fixing base 120, the side datum surface 180b facing in the direction (a direction opposite to the direction toward the second bearing 100) designated by the arrow Y2.

In this embodiment, the second guide rail 88 is pressed at a pair of positions on the outer periphery thereof located near to the pair of engaging projections 190, in a downward direction designated by the arrow Z2 and in the direction designated by the arrow Y1 (that is, in the direction toward the second bearing 100) by resilient forces of the other end portions 182c of the pair of resilient blocks 182 through the inclined surfaces 182a thereof, the pair of resilient blocks 182 being fixed on the height datum surfaces 120a of the pair of fixing bases 120. Resulting from this, the each engaging projection 190 of the second guide rail 88 is pressed against the height datum surface 120a of the corresponding fixing base 120 and the side datum surface 180b of the fixed projection 180 of the corresponding fixing base 120, and the second guide rail 88 can be rotatable around the pair of engaging projections 190 both in the clockwise direction and in the anti-clockwise direction so that the outer peripheral surface of the second guide rail 88 excluding the pair of engaging projections 190 is moved toward and away from the second bearing 100. During this rotation, each of the pair of engaging projections 190 of the second guide rail 88 is prevented from separating from the height datum surface 120a of the corresponding fixing base 120 and the side datum surface 180b of the fixed projection 180 of the corresponding fixing base 120 owing to the resilient force produced from the other end portion 182c of the corresponding resilient block 182.

Further in this modification, as shown by a two-dot chain line in FIG. 18, if a pair of further fixed projections 192 are formed on the height datum surfaces 120a of the pair of fixing bases 120 so that the each fixed projection 192 is symmetric with the fixed projection 180 on the same height datum surface 120a with the corresponding one of the engaging projections 190 of the second guide rail 88 interposed therebetween, the technical advantages of this invention can be surely obtained even if load applied from the second bearing 100 to the second guide rail 88 is large.

Second Modification of the Fifth Embodiment

FIG. 20 is a schematic cross sectional view of a main portion of a second modification of the linear guide apparatus of the fifth embodiment shown in FIG. 15, and FIG. 21 is a perspective view showing one end portion of a second guide rail (guide member) in the main portion of the second modification of the linear guide apparatus in FIG. 20 in an enlarged scale, the one end portion being located in the longitudinal direction of the second guide rail and being an important portion.

The structural members of this modification which are the same as those of the fifth embodiment described above with reference to FIGS. 15 to 17 are designated by the reference numerals which are used to designate the same structural members of the fifth embodiment, and the detailed descriptions thereof are omitted.

In this modification, a pair of engaging projections 200 are formed on the both longitudinal ends of the second guide rail 88, and the engaging projections 200 project from the both longitudinal ends in the same radius direction and by the same distance as to each other. Projecting end 200a of the each engaging projection 200 is eccentric with the longitudinal center line of the second guide rail 88, and abuts on the corner between the height datum surface 120a of the corresponding fixing base 120 and the side datum surface 180b of the fixed projection 180 formed on the height datum surface 120a of the corresponding fixing base 120, the side datum surface 180b facing in the direction designated by the arrow Y2. Such projecting end 200a of the each engaging projection 200 forms a rotational center for the second guide rail 88.

In this modification, the second guide rail 88 is pressed at a pair of positions on the outer periphery thereof located near to the pair of engaging projections 200, in the downward direction designated by the arrow Z2 and in the direction designated by the arrow Y1 (that is, in the direction toward the second bearing 100) by resilient forces of the other end portions 182c of the pair of resilient blocks 182 through the inclined surfaces 182a thereof, the pair of resilient blocks 182 being fixed on the height datum surfaces 120a of the pair of fixing bases 120. Resulting from this, the projecting end 200a of the each engaging projection 200 of the second guide rail 88 is pressed against the corner between the height datum surface 120a of the corresponding fixing base 120 and the side datum surface 180b of the fixed projection 180 of the corresponding fixing base 120, and the second guide rail 88 can be rotatable around the projecting ends 200a of the pair of engaging projections 200 both in the clockwise direction and in the anti-clockwise direction so that the outer peripheral surface of the second guide rail 88 excluding the pair of engaging projections 200 is moved toward and away from the second bearing 100. During this rotation, the projecting end 200a of the each engaging projection 200 is prevented from separating from the corner between the height datum surface 120a of the corresponding fixing base 120 and the side datum surface 180b of the fixed projection 180 of the corresponding fixing base 120 owing to the resilient force produced from the other end portion 182c of the corresponding resilient block 182.

Third Modification of the Fifth Embodiment

FIG. 22 is a schematic cross sectional view of a main portion of a third modification of the linear guide apparatus of the fifth embodiment shown in FIG. 15, and FIG. 23 is a perspective view showing one end portion of a second guide rail (guide member) in the main portion of the third modification of the linear guide apparatus in FIG. 22 in an enlarged scale, the one end portion being located in the longitudinal direction of the second guide rail and being an important portion.

The structural members of this modification which are the same as those of the fifth embodiment described above with reference to FIGS. 15 to 17 are designated by the reference numerals which are used to designate the same structural members of the fifth embodiment, and the detailed descriptions thereof are omitted.

In this modification, a pair of gear wheels 202, 202 are formed on the longitudinal both end portions of the outer periphery of the second guide rail (guide member) 88, and the pair of gear wheels 202, 202 are concentric with the outer periphery of the second guide rail 88 and have the same tooth pitch as to each other. The each of the pair of gear wheels 202, 202 of the longitudinal both end portions of the second guide rail 88 is engaged with a rack 204 on the height datum surface 120a of the corresponding fixing base 120. The each rack 204 extends in the direction (designated by the arrows Y1 and Y2) which is perpendicular to the longitudinal directions of the first and second guide rails (guide members) 86, 88, and has the same teeth pitch as that of the each gear wheel 202.

That is, in this modification, if it is thought that the pair of racks 204 on the height datum surfaces 120a of the pair of fixing bases 120 are engaging means, the pair of gear wheels 202, 202 on the both end portions of the second guide rail 88 which engage with the racks 204 are thought as engaged means.

In this modification, the second guide rail 88 is pressed at a pair of positions on the outer periphery thereof located near to the pair of gear wheels 202, 202 and separated in the peripheral direction of the second guide rail 88 from the engaging positions of the gear wheels 202, 202 to the pair of racks 204, in the downward direction designated by the arrow Z2 and in the direction designated by the arrow Y1 (that is, in the direction toward the second bearing 100) by resilient forces of the other end portions 182c of the pair of resilient blocks 182 fixed on the height datum surfaces 120a of the pair of fixing bases 120. Resulting from this, the gear wheels 202, 202 of the second guide rail 88 are pressed against the pair of racks 204 on the height datum surfaces 120a of the pair of fixing bases 120, and the second guide rail 88 can be rotatable both in the clockwise direction and in the anti-clockwise direction with the gear wheels 202, 202 being engaged with the racks 204 so that the outer peripheral surface of the second guide rail 88 excluding the pair of gear wheels 202, 202 is moved toward and away from the second bearing 100. During this rotation, the gear wheels 202, 202 are prevented from separating from the racks 204 of the fixing bases 120 owing to the resilient forces produced from the other end portions 182c of the resilient blocks 182.

Fourth Modification of the Fifth Embodiment

FIG. 24 is a schematic cross sectional view of a main portion of a fourth modification of the linear guide apparatus of the fifth embodiment shown in FIG. 15, and FIG. 25 is a perspective view showing one end portion of a second guide rail (guide member) in the main portion of the fourth modification of the linear guide apparatus in FIG. 24 in an enlarged scale, the one end portion being located in the longitudinal direction of the second guide rail and being an important portion.

The structural members of this modification which are the same as those of the fifth embodiment described above with reference to FIGS. 15 to 17 are designated by the reference numerals which are used to designate the same structural members of the fifth embodiment, and the detailed descriptions thereof are omitted.

In this modification, an engaging depression 206 is formed in the outer peripheral surface of the second guide rail (guide member) 88, and the engaging depression 206 extends along the longitudinal direction of the second guide rail 88. An elongated fixed projection 208 is formed on the height datum surface 120a of the each fixing base 120, and the elongated fixed projection 208 projects in the upward direction designated by the arrow Z1 and extends along the longitudinal direction of the second guide rail 88. The engaging depression 206 of the second guide rail 88 is engaged with the fixed projection 208 of the each fixing base 120.

That is, in this modification, if it is thought that the fixed projection 208 of the each fixing base 120 is engaging means, the engaging depression 206 of the second guide rail 88 engaged with the fixed projections 208 is thought as engaged means.

In this modification, the second guide rail 88 is pressed at a pair of positions on the outer periphery thereof located on the both longitudinal end portions thereof, the each position being separated in the peripheral direction of the second guide rail 88 from the engaging depression 206, in the downward direction designated by the arrow Z2 and in the direction designated by the arrow Y1 (that is, in the direction toward the second bearing 100) by resilient forces of the other end portions 182c of the pair of resilient blocks 182 fixed on the height datum surfaces 120a of the pair of fixing bases 120. Resulting from this, an edge 206a in the opening of the engaging depression 206 of the second guide rail 88, the edge 206a being located in the direction designated by the arrow Y2 (that is, in the direction opposite to the direction toward the second bearing 100) in the opening, is pressed on a corner between the height datum surface 120a of the each fixing base 120 and a side datum surface 208a of the corresponding fixed projections 208 which faces in the direction designated by the arrow Y2 (that is, in the direction opposite to the direction toward the second bearing 100). The second guide rail 88 can be rotatable around the edge 206a both in the clockwise direction and in the anti-clockwise direction so that the outer peripheral surface of the second guide rail 88 is moved toward and away from the second bearing 100. During this rotation, the edge 206a in the opening of the engaging depression 206 of the second guide rail 88 is prevented from separating from the corner between the height datum surface 120a of the each fixing base 120 and the side datum surface 208a of the corresponding fixed projection 208 which faces in the direction designated by the arrow Y2 (that is, in the direction opposite to the direction toward the second bearing 100).

Sixth Embodiment

Figure 26:
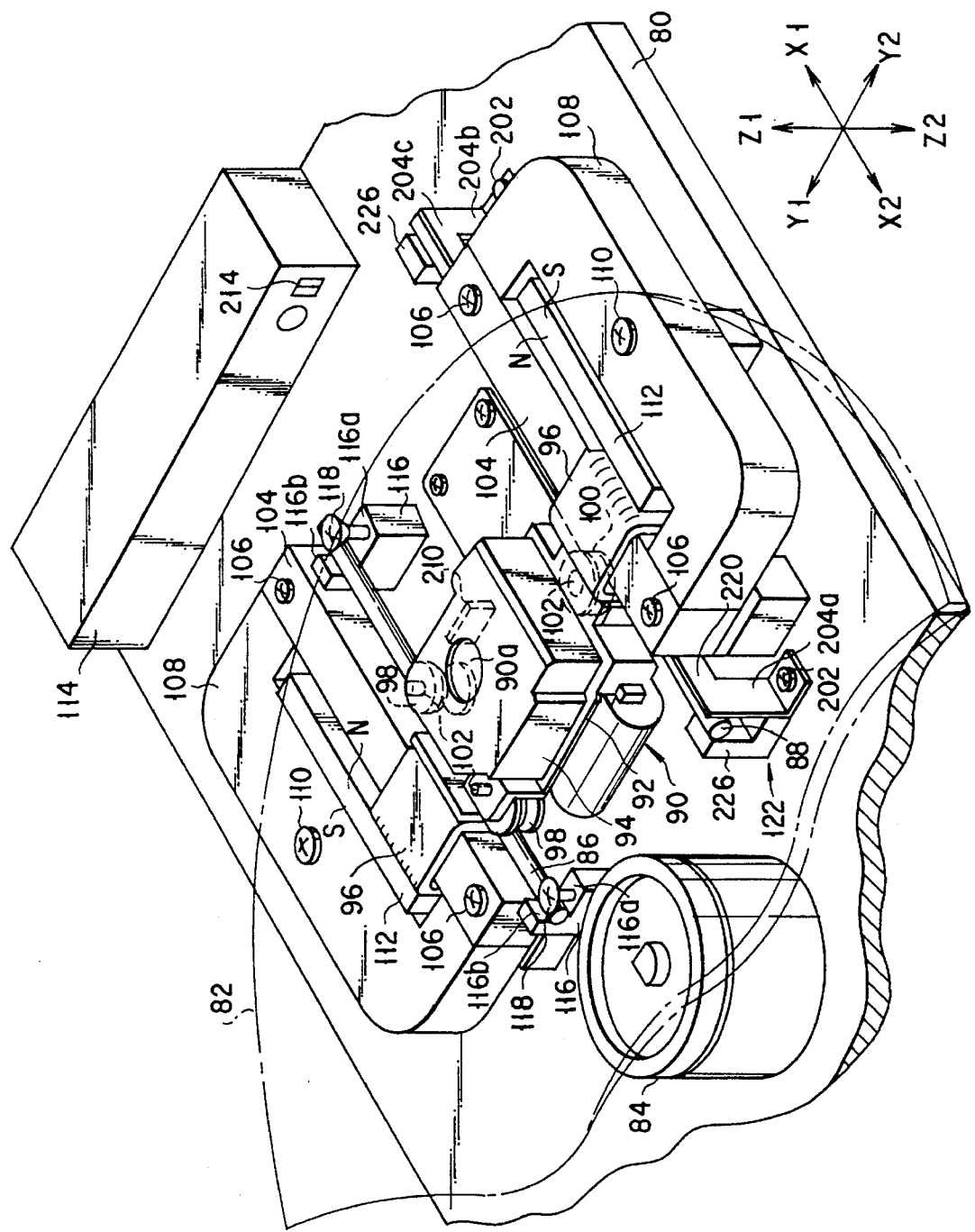
FIG. 26 is a schematic perspective view of a linear guide apparatus according to a sixth embodiment of the present invention.

FIG. 26 is a schematic perspective view of a linear guide apparatus of a sixth embodiment of this invention. FIG. 27A is a schematic plan view of a position detecting mechanism for detecting a position of a movable member of an optical pickup device using the linear guide apparatus of FIG. 26 in the tracking direction, in which the movable member is moved away from a static optical system, FIG. 27B is a schematic plan view of the position detecting mechanism, in which the movable member is approached a static optical system, and FIG. 27C shows a circuit formed by adding an adder to a differential signal detecting circuit of the position detecting mechanism.

Most part of the structure of this embodiment is the same as that of the first embodiment described above with reference to FIGS. 6 and 7. Therefore, structural members of this embodiment which are the same as those of the first embodiment are designated by the reference numerals which are used to designate the same structural members of the first embodiment, and the detailed descriptions thereof are omitted.

An opening which is not shown is formed in a surface of a cover 94 of the movable member 90 at a position which corresponds to a light beam projected from an static optical system 114 of the deck base 80, and the opening is covered by a cover glass 210. The cover glass 210 partially reflects the light beam from the static optical system 114 while it partially transmits the light beam, and the transmitted light beam incidents an objective lens 90a and is focalized on an information recording surface of an optical disc 82. The reflected light beam from the information recording surface reaches at the static optical system 114 through a light path along which the light beam from the static optical system 114 incidents on the information recording surface, and an information reproduction based on the reflected light is performed.

The cover glass 210 inclines its normal line to an optical axis 212 of the light beam from the static optical system 114 with an angle between a few minutes and a few degrees.

Resulting from this, the part of the light beam from the static optical system 114 partially reflected on the cover glass 210 incidents a two segmented optical sensor 214 on the static optical system 114, the two segmented optical sensor 214 being located at a position which corresponds to the normal line of the cover glass 210.

A differential amplifier 216 is connected to the two segmented optical senses 214, and the differential amplifier 216 detects a differential signal S between two segments 214a and 214b of the two segmented optical sensor 214 which are arranged in the two directions designated by the two arrows Y1 and Y2. The differential signal S is used to detect the position of the movable member 90 in the tracking direction (designated by the arrows X1 and X2).

The position detection in the tracking direction is performed as described below. As shown in FIG. 27A, when the movement member 90 is moved away from the static optical system 114, an amount of the reflected light beam from the cover glass 210 which incidents one segment 214a of the Y2-direction side of the two segmented optical sensor 214 is larger than that of the other segment 214b of the Y1-direction side. In this case, the differential amplifier 216 outputs "+" differential signal S. Further, as shown in FIG. 27B, when the movement member 90 is approached to the static optical system 114, an amount of the reflected light beam from the cover glass 210 which incidents the other segment 214b of the Y1-direction side is larger than that of the one segment 214a of the Y2-direction side. In this case, the differential amplifier 216 outputs "−" differential signal S.

As described above, the position of the movable member 90 in the tracking direction (designated by the arrows X1 and X2) can be detected on the basis of the level of the differential signal S. Further, the differential signal S can be standardized in the all reflected light beam from the cover glass 210 which incidents the two segmented optical sensor 214 by adding an adder 218 to the differential amplifier 216 in parallel thereto, as shown in FIG. 27C.

By arranging the cover glass 210 and the two segmented optical sensor 214 as described above, the position of the movable meter 90 in the tracking direction (designated by the arrows X1 and X2) can be detected in a high accuracy, and the movable member 90 can enjoy a high dust proofing. Further, since the cover glass 210 is inclined, the reflected light beam reflected on the cover glass 210 can be prevented from backing toward the static optical system 114 so that the static optical system 114 can perform an information reproduction from the information recording surface of the optical disc 82 in a high accuracy.

The above described combination of the cover glass 210 with the two segmented optical sensor 214 can be applied to all of the various embodiments and modifications described above with reference to FIGS. 6 to 25, in order to make all of the various embodiments and modifications enjoy the technical advantages resulting from the combination.

Next, a structure of pre-load adjusting means 122 for the second guide rail 86 in this embodiment will be explained in detail with reference to FIGS. 28 and 29.

Figure 28:
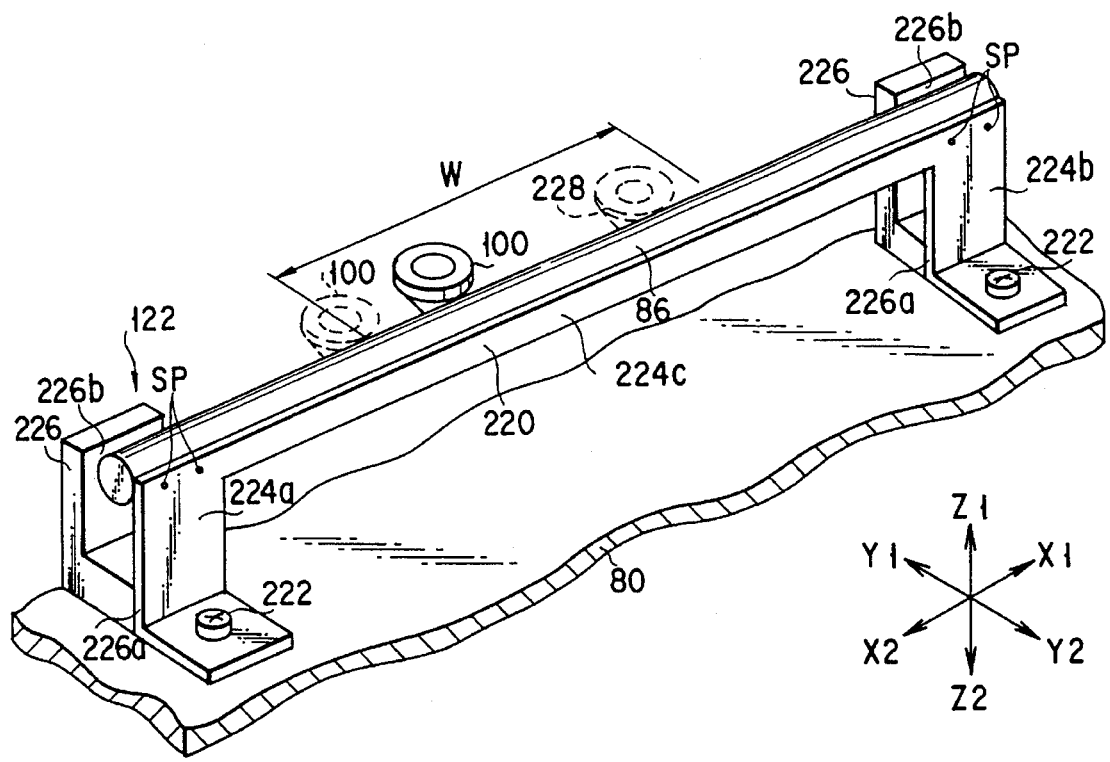
FIG. 28 is an enlarged perspective view of a main part of the linear guide apparatus shown in FIG. 26.
Figure 29:
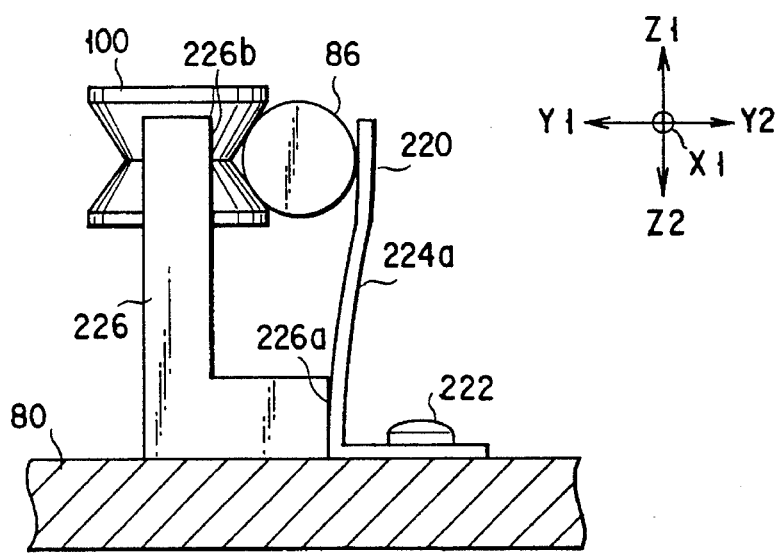
FIG. 29 is an enlarged side view of the main part of the linear guide apparatus shown in FIG. 26.

FIG. 28 is an enlarged perspective view of a main portion of the linear guide apparatus according to the sixth embodiment of the invention and shown in FIG. 26, and FIG. 29 is an enlarged side view of the main portion of the linear guide apparatus shown in FIG. 26.

In this embodiment, the second guide rail 88 is fixed on the upper surface of the deck base 80 through a fixing member 220 formed of a plate spring. In particularly, the fixing member 220 includes a pair of leg portions 224a and 224b which extend in the upward direction as designated by the arrow Z1 at positions on the upper surface of the deck base 80 corresponding to the longitudinal both end portions of the second guide rail 22, and a bridge portion 224a which extends along the second guide rail 88 between upper end portions of the leg portions 224a and 224b and are connected integrally at its both longitudinal ends to the upper end portions of the leg portions 224a and 224b. The upper end portions of the leg portions 224a and 224b are fixed by spot weldings SP to regions of the longitudinal both end portions of the outer peripheral surface of the second guide rail 22, the regions facing in the direction designated by the arrow Y2, and the lower end portions of the leg portions 224a and 224b are bend to arrange along the upper surface of the deck base 80 and are fixed on the upper surface by screws 222.

Further, a pair of position determining projections 226 are formed on the upper surface of the deck base 80 at positions corresponding to the longitudinal both end portions of the second guide rail 22 and separating from the lower end portions of the leg portions 224a and 224b of the fixing member 220 in the direction designated by the arrow Y1.

The pair of position determining projections 226 project in the upward direction designated by the arrow Z1, and upper end portions of the position determining projections 226 are located near to regions of the longitudinal both end portions of the outer peripheral surface of the second guide rail 22, the regions facing in the direction designated by the arrow Y1. Further, the pair of position determining projections 226 extend along the upper surface of the deck base 80 toward the pair of leg portions 224a and 224b of the fixing member 220, and sidewardly extending end surfaces 226a of the pair of position determining projections 226 contact the pair of leg portions 224a and 224b.

Side surface 226b of the upper end portion of the each position determining projection 226 which faces the second guide rail 88 (in the direction designated by the arrow Y2) and the sidewardly extending end surface 226a of the lower end portion of the same position determining projection 226 are parallel to each other. Further, the side surfaces 226b of the upper end portions of the position determining projections 226 and the sidewardly extending end surfaces 226a of the lower end portions thereof are parallel to each other, and are parallel to the longitudinal center line of the first guide rail.

The side surfaces 226b of the upper end portions of the pair of position determining projections 226 and the sidewardly extending end surfaces 226a of the lower end portions thereof function as sideward position determining surfaces for the both longitudinal end portions of the second guide rail 88 and the pair of leg portions 224a and 224b of the fixing member 220.

When the second bearing 100 does not abut on the second guide rail 88, the second guide rail 88 is held by the fixing member 220 so that second guide rail 88 is in parallel to the first guide rail 86 (FIG. 26).

When the second bearing 100 is supported on the second guide rail 88 while the pair of first bearings 100 are supported on the first guide rail 86, as shown in FIG. 26, the pair of leg portions 224a and 224b of the fixing member 220 are bend slightly in the direction designated by the arrow Y2 in which the leg portions 224a and 224b are moved away from the first guide rail 86, as shown in FIG. 29. In this condition, the second guide rail 88 is urged in the direction designated in the arrow Y1, to approach the first guide rail 86 by the resilient forces of the pair of leg portions 224a and 224b of the fixing member 220, whereby the second bearing 100 can rotates on the second guide rail 88 without rattling.

The second guide rail 88, as particularly shown in FIG. 29, contacts only the second bearing 100 while it is supported by the fixing member 220, and does not contact any other structural members of this embodiment.

A moving range of the second bearing 100 designated by a reference numeral W on the second guide rail 88 in FIG. 28 is so set that it has a longitudinal length being about ½ of that of the second guide rail 88 and a longitudinal center of the moving range is located at a longitudinal center of the second guide rail 88. That is, when the movable member 90 (FIG. 26) is located at the center of its moving range in the tracking direction (designated by the arrows X1 and X2), the second bearing 100 is located at the longitudinal center of the second guide rail 88. At this time, amount of bending of each of the pair of leg portions 224a and 224b of the fixing member 220 is equal to each other, so that the second guide rail 88 can be kept in parallel to the first guide rail 86 (FIG. 26).

When the movable member 90 moves from the center of the moving range W in the direction designated by the arrow X2 so that the second bearing 100 approaches to the leg portion 224a located in the direction designated by the arrow X2, the amount of bending of the leg portion 224a becomes larger than that of the leg portion 224b located in the direction designated by the arrow X1. And, the second guide rail 88 rotates slightly around the Z axis from the position at which the second guide rail 88 is in parallel to the first guide rail 86, and inclines to the first guide rail 86.

Since the second guide rail 88 is supported only by the leg portions 224a and 224b of the fixing member 220, the above described rotation of the second guide rail 88 can be performed smoothly so that the second bearing 100 can move smoothly on the second guide rail 88.

When at least one of the pair of leg portions 224a and 224b is bent in the direction designated by the arrow Y2 to move away from the first guide rail 86, the second guide rail 88 is rotated around the lower end portion of the at least one of the leg portions 224a and 224b and is moved slightly in the downward direction designated by the arrow Z2. In this case, since the amount of bending of each of the pair of leg portions 224a and 224b is smaller than the length thereof in the Z axis direction, the movement of the second guide rail 88 in the Z-axis direction is so small that can be neglected. Therefore, the parallelism of the second guide rail 88 to the first guide rail 86 is changed in the X-Y plain, the second guide rail 88 keeps to cross the rotational center line of the second bearing 100 will not be changed. Therefore, the rotation of the moving member 90 around each of the X, Y, Z axes will not be caused. Since, as shown in FIG. 29, the second guide rail 88 always contacts at its two positions the second bearing 100, the second bearing 100 is prevented from slipping on the second guide rail 88 in the directions designated by the arrows Z1 and Z2 so that wearings of the second bearing 100 and the second guide rail 88 in the Z1 and Z2 directions are small. Further, since the pair of the leg portions 224a and 224b of the fixing member 220 extend in the Z1 and Z2 directions, the second guide rail 88 is prevented from moving in the direction along the Z axis when vibration is transmitted to the deck base 80 from the outside thereof.

If a damper is mounted on each of the pair of the leg portions 224a and 224b, the second guide rail 88 is prevented from vibrating caused by resonance of the pair of the leg portions 224a and 224b.

The fixing member 220 may be structured by only the pair of the leg portions 224a and 224b without using the bridge portion 224c. And, the fixing member 220 may be formed not by the plate spring but by the line shaped spring material.

In this embodiment, a third bearing which abuts on the second guide rail 88 may be used to support the moving member 90. In this case, as shown in FIG. 28, the second bearing 100 and the third bearing 228 are arranged along the second guide rail 88 so as to separate from each other, and a distance between the second bearing 100 and the third bearing 228 is so set that it is the same as that between the pair of the first bearings 98, 98 (FIG. 26). Further, the second bearing 100 and the third bearing 228 are arranged at both sides of the longitudinal center of the second guide rail 88 so as to be symmetrical with each other to the longitudinal center when the moving member 90 (FIG. 26) is located at the center of the moving range thereof in the tracking direction (designated by the arrows X1 and X2).

If the third bearing 228 is employed, the second guide rail 88 is prevented effectively from vibrating when one portion of the second guide rail 88 located in the longitudinal direction thereof is bend suddenly owing to sudden movement of the moving member 90 in the tracking direction (designated by the arrows X1 and X2).

Seventh Embodiment

FIG. 30 is a schematic perspective view of a main portion of a linear guide apparatus of a seventh embodiment of this invention, and FIG. 31 is a schematic plan view of the main portion of FIG. 30.

Most part of the structure of this embodiment is the same as that of the sixth embodiment described above with reference to FIGS. 26 to 29. Therefore, structural members of this embodiment which are the same as those of the sixth embodiment are designated by the reference numerals which are used to designate the same structural members of the sixth embodiment, and the detailed descriptions thereof are omitted.

As shown in FIGS. 30 and 31, a side of the second guide rail 88 of the seventh embodiment is cut off between the both longitudinal end portions thereof by ⅔ of the diameter or the each longitudinal end portion, the side of the second guide rail 88 being opposite to the side of the second guide rail 88 on which the second bearing 100 abuts. The length of the thin portion 230 of the second guide rail 88 in its longitudinal direction is longer than that of the moving range W of the second bearing 100 on the second guide rail 88.

A pair of fixing members 232 are formed on the upper surface of the deck base 80 at positions corresponding to the both end portions of the second guide rail 88, and project in the upward direction designated by the arrow Z1.

The both end portions of the second guide rail 88 are supported on height datum surfaces 232a of the pair of fixing members 232, and the both end portions are abutted on side datum surfaces 232c of sidewardly position determining projections 232b projecting in the upward direction designated by the arrow Z1 from the upper surfaces of the fixing members 232, the side datum surfaces 232c facing in the direction designated by the arrow Y2. Further, the both end portions of the second guide rail 88 are fixed on the upper surfaces of the fixing members 232 by heads of a pair of screws 234 with the both end portions of the second guide rail 88 being abutted on the side datum surfaces 232c. In this embodiment, each of the side datum surfaces 232c of the fixing members 232 is structured by a curved surface which projects in the direction designated by the arrow Y2. A flat bottom surface of the thin portion 230 of the second guide rail 88 the both end portions of which are fixed on the height datum surfaces 232a of the pair of fixing members 232 is in parallel to the X-Z plain. Therefore, the stiffness of the thin portion 230 in the directions designated by the arrows Y1 and Y2 is lowered, so that the thin portion 230 is bent slightly and resiliently in the direction designated by the arrow Y2 when the second bearing 100 abuts on the thin portion 230. By this slight bending of the thin portion 230, the second guide rail 88 applies a pre-load on the second bearing 100.

This embodiment needs a smaller number of structural members than those of the sixth embodiment described above with reference to FIGS. 26 to 29 in which the fixing member 220 is formed of the plate spring being independent of the deck base 80. Further, since the structure of the each fixing member 232 is simple and the second guide rail 88 has the thin portion 230, various structural members not shown can be arranged around the each fixing member 232 and the thin portion 230 of the second guide rail 88 in a high density to reduce the outer size of the linear guide apparatus.

First Modification of the Seventh Embodiment

Figure 32:
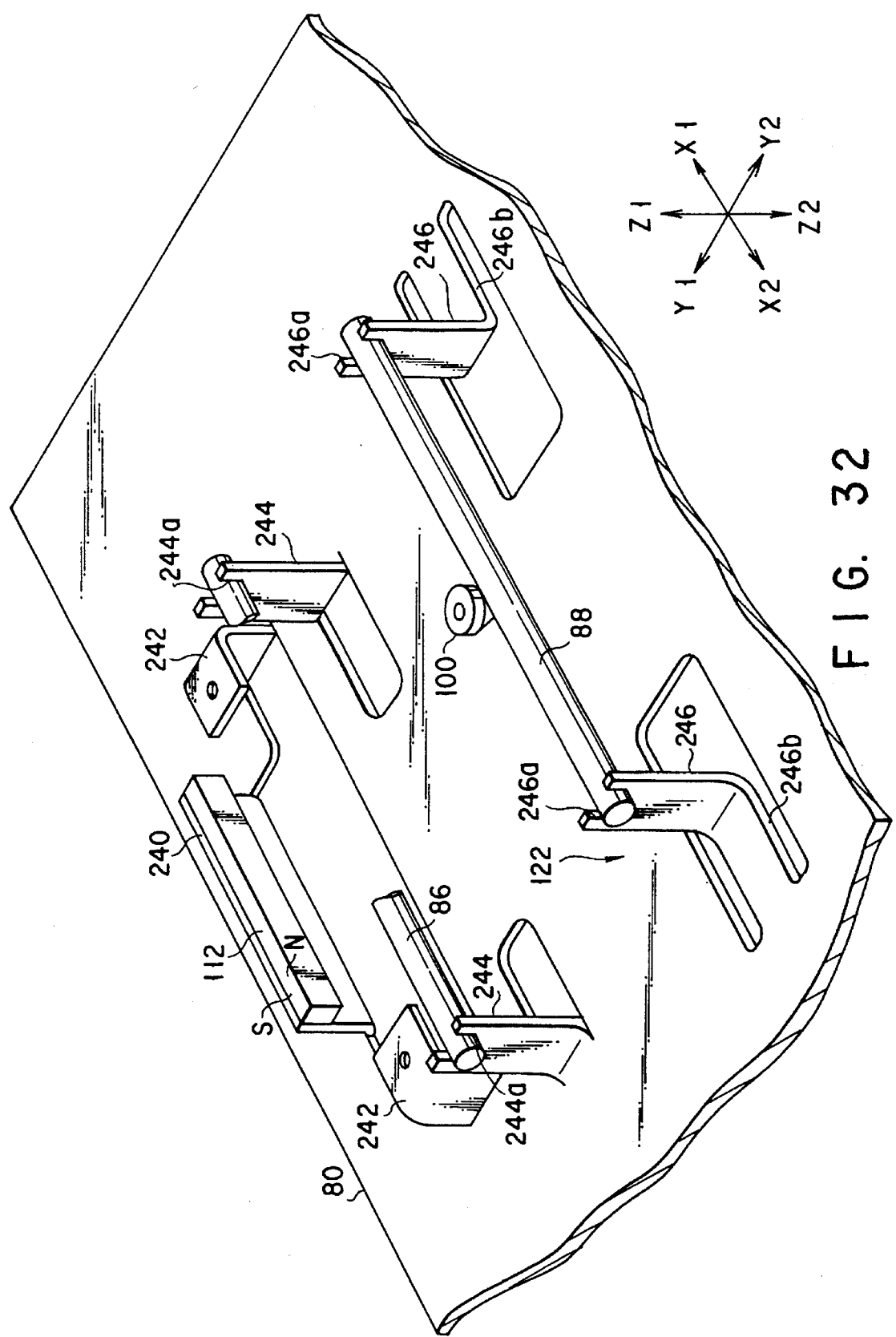
FIG. 32 is a schematic perspective view of a main part of a first modification of the linear guide apparatus shown in FIG. 30.

FIG. 32 is a schematic perspective view of a main portion of a first modification of the linear guide apparatus of the above described seventh embodiment.

Most part of the structure of this modification is the same as that of the sixth embodiment described above with reference to FIGS. 26 to 29. Therefore, structural members of this modification which are the same as those of the sixth embodiment are designated by the reference numerals which are used to designate the same structural members of the sixth embodiment, and the detailed descriptions thereof are omitted.

In this modification, the fixing member 220 in the sixth embodiment is formed integrally with the deck base 80. The deck base 80 of this modification is formed by subjecting a stainless material to a press work. A first fixing projection 240 for fixing the magnet 112 and a pair of second fixing projections 242 to which both longitudinal end portions of the inner yoke 104 (FIG. 26) are fixed by the screws 106, are formed in the deck base 80 by cutting off the deck base 80 and upwardly bending remaining portions thereof surrounded by cut off lines.

Further, a pair of third fixing portions 244 are arranged near to the second fixing projections 242 in the direction designated by the arrow Y2 in the deck base 80, and the third fixing portions 244 are formed in the same manner as that of the second fixing projections 242, that is, by cutting off the deck base 80 and upwardly bending remaining portions thereof surrounded by cut off lines. Depressions 224a are formed in upper ends of the third fixing portions 244, and the both longitudinal end portions of the first guide rail 86 are press fitted in the depressions 224a and are fixed thereto.

Further, a pair of fourth fixing portions 246 are arranged at positions in the deck base 80 which are spaced apart from the third fixing projections 244 by a predetermined direction in the direction designated by the arrow Y2, and the fourth fixing portions 246 are formed in the same manner as that of the third fixing projections 244, that is, by cutting off the deck base 80 and upwardly bending remaining portions thereof surrounded by cut off lines. Depressions 226a are formed in upper ends of the fourth fixing portions 246, and the both longitudinal end portions of the second guide rail 88 are press fitted in the depressions 224a and are fixed thereto. Each of lower end portions 246b of the fourth fixing portions 246 is cut off from the deck base 80 so as to extend along the deck base 80, and such fourth fixing portions 246 applies a pre-load to the second bearing 100 through the second guide rail 88 while the lower end portions 246b are twisted around the X-axis.

In this modification, since the first fixing projection 240 on which the magnet 112 is fixed is integral with the deck base 80 so that the deck base 80 functions as an outer yoke, the number of the structural members of this modification can be reduced in comparison with the sixth embodiment which uses the independently formed outer yoke 108 (FIG. 26).

Since magnetic fluxes from the magnet 112 flow in the Z-axis direction in the deck base 80, the first fixing projection 240 does not tend to be magnetically saturated even if the size of the first fixing projection 240 in the directions designated by the arrows Y1 and Y2 is small.

Second Modification of the Seventh Embodiment

Figure 33:
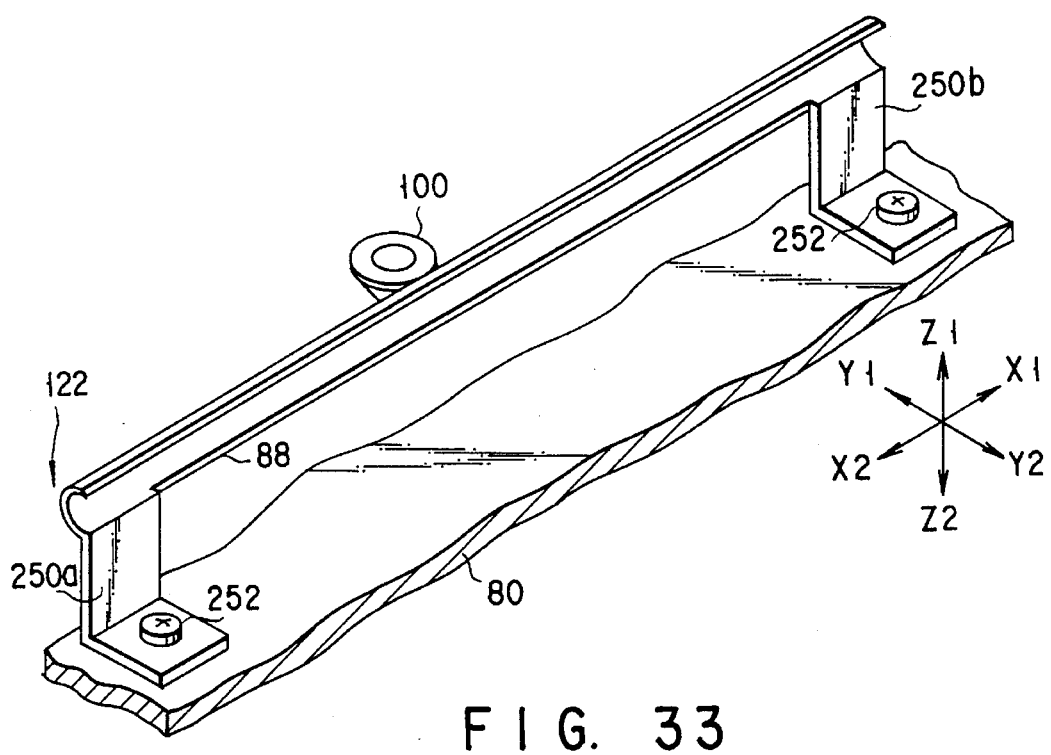
FIG. 33 is a schematic perspective view of a main part of a second modification of the linear guide apparatus shown in FIG. 30.

FIG. 33 is a schematic perspective view of a main portion of a second modification of the linear guide apparatus of the above described seventh embodiment.

Most part of the structure of this modification is the same as that of the sixth embodiment described above with reference to FIGS. 26 to 29. Therefore, structural members of this modification which are the same as those of the sixth embodiment are designated by the reference numerals which are used to designate the same structural members of the sixth embodiment, and the detailed descriptions thereof are omitted.

In this modification, the second guide rail 88 and a pair of fixing members 250a, 250b for fixing the both longitudinal end portions of the second guide rail 88 on the upper surface of the deck base 80 are formed of a plate member having resilience so as to be integrally with each other. The second guide rail 88 is formed to have a curved cross section which projects in the direction toward the second bearing 100, and applies a pre-load to the second bearing 100 by the resilient forces produced from the pair of fixing members 250a, 250b the lower end portions of which are fixed on the upper surface of the deck base 80 by screws 252. The second guide rail 88 having the half cylindrical cross section has a high stiffness in the directions designated by the arrows Y1 and Y2, and it is not bend in the directions. With this structure, the number of the structural members thereof can be decreased so that the manufacturing cost thereof can also be decreased.

Third Modification of the Seventh Embodiment

Figure 34:
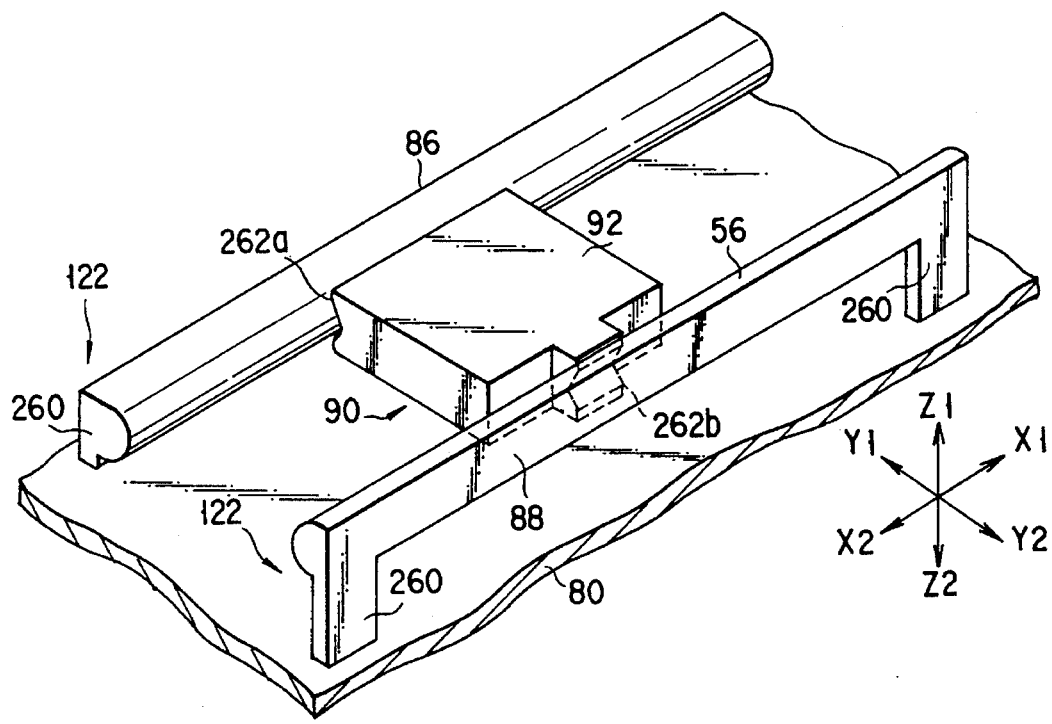
FIG. 34 is a schematic perspective view of a main part of a third modification of the linear guide apparatus shown in FIG. 30.

FIG. 34 is a schematic perspective view of a main portion of a third modification of the linear guide apparatus of the above described seventh embodiment.

Most part of the structure of this modification is the same as that of the sixth embodiment described above with reference to FIGS. 26 to 29. Therefore, structural members of this modification which are the same as those of the sixth embodiment are designated by the reference numerals which are used to designate the same structural members of the sixth embodiment, and the detailed descriptions thereof are omitted.

In this modification, the deck base 80, the first and second guide rails 86, 88, and two pairs of fixing members 260 for fixing the both longitudinal end portions of the first and second guide rails 86, 88 on the upper surface of the deck base 80 are formed of a plastic material, such as PPS (Polyphenylene sulfide), LCP (Liquid crystal plastic), PEI (Polyether imide), etc. so as to be integral with each other.

The carriage 92 of the moving member 90 is formed of the same material as that of the deck base 80. First and second guide receptacles 262a and 262b are formed in both side surfaces of the carriage 92, the both side surfaces facing in the directions designated by the arrows Y1 and Y2 and facing to the first and second guide rails 86, 88, and each of the first and second guide receptacles 262a and 262b is structured by a laid down V-shaped groove. And, the first and second guide receptacles 262a and 262b are abutted on the first and second guide rails 86, 88. The first and second guide receptacles 262a and 262b of the moving member 90 (FIG. 26) are applied with a pre-load from the first and second guide rails 86, 88 produced by the resilient forces of the two pairs of fixing members 260.

In this modification, since the deck base 80, the first and second guide rails 86, 88, and the two pairs of fixing members 260 are formed integrally with each other, manufacturing thereof is easy, the number of the structural members of this modification is small, and further positional accuracy between them is good.

Further, in this modification, each of the first and second guide receptacles 262a and 262b is structured by a laid down V-shaped groove, but each of the first and second guide receptacles 262a and 262b may be structured by the first and second bearings 98, 100 used in the above described various embodiments and modifications.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A linear guide apparatus comprising:

a base;

a movable member formed independently of said base and movable with respect to said base;

first and second guide receptacles provided to said movable member;

a first guide member, fixed on said base, extending linearly, and received by said first guide receptacle, for guiding a moving direction of said first guide receptacle;

a second guide member, arranged on said base to extend in the same direction as that of said first guide member to be in parallel to said first guide member, and received by said second guide receptacle, for guiding a moving direction of said second guide receptacle; and pre-load adjusting means, provided on said base, for supporting said second guide member to be movable in parallel to said first guide member and adjusting a distance between said first and second guide members, thereby adjusting a pre-load applied between said first and second guide members and said first and second guide receptacles of said movable member, wherein said pre-load adjusting means includes a stationary projection fixed on said base, a pre-load block, and pivot angle adjusting means, said pre-load block having a recessed portion to be pivotally seated on said stationary projection and to change a pivot angle around said stationary projection, and being brought into contact with said second guide member, thereby moving said second guide member to change the distance between said first and second guide members, and said pivot angle adjusting means being capable of adjusting the pivot angle of said pre-load block.

2. A linear guide apparatus according to claim 1, wherein a surface region of said pre-load block which is brought into contact with said second guide member is constituted by an inclined surface which cooperates with a surface of said base to sandwich said second guide member, and said pivot angle adjusting means is a screw member which extends through said pre-load block and threadably engages with said base, said screw member being adjusted a threadable engaging amount with said base so that the pivot angle of said pre-load block on said stationary projection is changed.

3. A linear guide apparatus according to claim 1, wherein said stationary projection of said pre-load adjusting means is formed independently of said base.

4. A linear guide apparatus according to claim 1, wherein a portion of an outer surface of said stationary projection of said pre-load adjusting means on which the recessed portion of said pre-load block is seated is at least a part of a circle or ball.

5. A linear guide apparatus according to claim 4, wherein said stationary projection of said pre-load adjusting means has at least a circular cross section, is arranged along a base portion of a positioning projection formed on a surface of said base, and is sandwiched between the recessed portion of said pre-load block and said base portion of said positioning projection.

6. A linear guide apparatus according to claim 4, wherein said stationary projection of said pre-load adjusting means has at least a circular cross section, is seated in a positioning recessed portion formed in a surface of said base, and is sandwiched between the recessed portion of said pre-load block and the positioning recessed portion.

7. A linear guide apparatus according to claim 1, wherein said stationary projection of said pre-load adjusting means is formed integrally with said base.

8. A linear guide apparatus according to claim 1, wherein an outer surface of said stationary projection of said pre-load adjusting means forms a corner portion projecting outward, and the recessed portion of said pre-load block is formed of a corner portion having an open angle of 90° to 180°.

9. A linear guide apparatus comprising:

a base;

a movable member formed independently of said base and movable with respect to said base;

first and second guide receptacles provided to said movable member;

a first guide member, fixed on said base, extending linearly, and received by said first guide receptacle, for guiding a moving direction of said first guide receptacle;

a second guide member, arranged on said base to extend in the same direction as that of said first guide member to be in parallel to said first guide member, and received by said second guide receptacle, for guiding a moving direction of said second guide receptacle; and pre-load adjusting means, provided on said base, for supporting said second guide member to be movable in parallel to said first guide member and adjusting a distance between said first and second guide members, thereby adjusting a pre-load applied between said first and second guide members and said first and second guide receptacles of said movable member, wherein said pre-load adjusting means includes a positioning recessed portion formed in said base, a pre-load block, and pivot angle adjusting means, said pre-load block having a projection to be pivotally seated in the positioning recessed portion and to change a pivot angle around said projection, and being brought into contact with said second guide member, thereby moving said second guide member to change the distance between said first and second guide members, and said pivot angle adjusting means being capable of adjusting the pivot angle of said pre-load block.

10. A linear guide apparatus according to claim 9, wherein said pre-load block is formed of a plate member and a surface region of said pre-load block which is brought into in contact with said second guide member is constituted by an inclined surface which cooperates with a surface of said base to sandwich said second guide member, and said projection is formed on said pre-load block by press work.

11. A linear guide apparatus according to claim 9, wherein said pivot angle adjusting means is a screw member which extends through said pre-load block and threadably engages with said base, said screw member being adjusted a threadable engaging amount with said base so that the pivot angle of said pre-load block on said stationary projection is changed.

12. A linear guide apparatus comprising:

a base;

a movable member formed independently of said base and movable with respect to said base;

first and second guide receptacles provided to said movable member;

a first guide member, fixed on said base, extending linearly, and received by said first guide receptacle, for guiding a moving direction of said first guide receptacle;

a second guide member, arranged on said base to extend in the same direction as that of said first guide member to be in parallel to said first guide member, and received by said second guide receptacle, for guiding a moving direction of said second guide receptacle; and pre-load adjusting means, provided on said base, for supporting said second guide member to be movable in parallel to said first guide member and adjusting a distance between said first and second guide members, thereby adjusting a pre-load applied between said first and second guide members and said first and second guide receptacles of said movable member, wherein said pre-load adjusting means includes a positioning projection formed on said base, a pre-load block, and pivot angle adjusting means, said pre-load block having a projection to be pivotally seated in a base portion of said positioning projection and to change a pivot angle around said projection, and being brought into contact with said second guide member, thereby moving said second guide member to change the distance between said first and second guide members, and said pivot angle adjusting means being capable of adjusting the pivot angle of said pre-load block, and a surface region of said pre-load block which is brought into contact with said second guide member is constituted by an inclined surface which cooperates with a surface of said base to sandwich said second guide member, said pre-load block has another inclined surface at a position separated from said surface region, said another inclined surface facing toward a direction substantially opposite to said surface region and being inclined with respect to said surface region, said surface region and said another inclined surface having extending lines that intersect at an angle of about 2° to 45, said pre-load block further has still another inclined surface intersecting said surface region and said another inclined surface to form an intersecting angle which is not more than 90° with said another inclined surface and which is set smaller than an intersecting angle of a base portion of said positioning projection with said surface of said base at an intersecting region on said base in which the base portion of said positioning projection intersected said surface of said base, and said projection of said pre-load block being constituted by art intersecting portion of said another inclined surface and said still another inclined surface.

13. A linear guide apparatus according to claim 12, wherein a cross section of a vertex of said projection is constituted by a curved surface, and two points of said projection separated from each other on said curved surface in its circumferential direction is brought into contact with a surface of said base portion of said positioning projection and said surface of said base at said intersecting region on said base.

14. A linear guide apparatus according to claim 12, wherein said pivot angle adjusting means is a screw member which extends through said pre-load block and threadably engages with said base, said screw member being adjusted a threadable engaging amount with said base so that the pivot angle of said pre-load block on said stationary projection is changed.

15. A linear guide apparatus comprising:

a base;

a movable member formed independently of said base and movable with respect to said base;

first and second guide receptacles provided to said movable member;

a first guide member, fixed on said base, extending linearly, and received by said first guide receptacle, for guiding a moving direction of said first guide receptacle;

a second guide member, arranged on said base to extend in the same direction as that of said first guide member to be in parallel to said first guide member, and received by said second guide receptacle, for guiding a moving direction of said second guide receptacle; and pre-load adjusting means, provided on said base, for supporting said second guide member to be movable in parallel to said first guide member and adjusting a distance between said first and second guide members, thereby adjusting a pre-load applied between said first and second guide members and said first and second guide receptacles of said movable member, wherein said pre-load adjusting means includes a stationary projection fixed on said base, and an elastic block fixed on said base and having an inclined surface which is brought into contact with said second guide member and cooperates with said stationary projection to sandwich said second guide member, and said second guide member has a recessed portion to be pivotally seated on said stationary projection, and changes a pivot angle around said stationary projection so as to elastically deform said elastic block, thereby changing a distance between said first and second guide members so that a pre-load applied between said first and second guide members and said first and second guide receptacles of said movable member is changed.

16. A linear guide apparatus according to claim 15, wherein said stationary projection of said pre-load adjusting means is formed independently of said base.

17. A linear guide apparatus according to claim 15, wherein a portion of an outer surface of said stationary projection of said pre-load adjusting means which is seated in the recessed portion of said second guide member is at least a part of a circle or ball.

18. A linear guide apparatus according to claim 17, wherein said stationary projection of said pre-load adjusting means is seated in a positioning recessed portion formed in said surface of said base, and is sandwiched between the recessed portion of said second guide member and the positioning recessed portion.

19. A linear guide apparatus comprising:

a base;

a movable member formed independently of said base and movable with respect to said base;

first and second guide receptacles provided to said movable member;

a first guide member, fixed on said base, extending linearly, and received by said first guide receptacle, for guiding a moving direction of said first guide receptacle;

a second guide member, arranged on said base to extend in the same direction as that of said first guide member to be in parallel to said first guide member, and received by said second guide receptacle, for guiding a moving direction of said second guide receptacle; and pre-load adjusting means, provided on said base, for supporting said second guide member to be movable in parallel to said first guide member and adjusting a distance between said first and second guide members, thereby adjusting a pre-load applied between said first and second guide members and said first and second guide receptacles of said movable member, wherein said pre-load adjusting means includes engaging means fixed on said base, an elastic block fixed on said base and having an inclined surface which is brought into contact with said second guide member and cooperates with said engaging means to sandwich said second guide member, and engaged means engageable with said engaging means fixed on said base at said second guide member, and said second guide member changes a pivot angle around an engaging position between said engaged means and said engaging means on said base so as to elastically deform said elastic block, thereby changing a distance between said first and second guide members so that a pre-load applied between said first and second guide members and said first and second guide receptacles of said movable member is changed.

20. A linear guide apparatus according to claim 19, wherein said engaging means on said base has a stationary projection fixed on said base, and said engaged means of said second guide member has an engaging projection at two separate positions of which are engaged with said stationary projection and said inclined surface of said elastic block.

21. A linear guide apparatus according to claim 20, wherein a region of an outer surface of said second guide member which is brought into contact with said second guide receptacle has a cross section forming at least a part of a circle, and said engaging projection of said second guide member projects in an extending direction of said second guide member in said cross section of said second guide member.

22. A linear guide apparatus according to claim 21, wherein said second guide member has a substantially circular cross section, and said engaging projection of said second guide member projects from two end faces of said second guide member in the extending direction of said second guide member.

23. A linear guide apparatus according to claim 19, wherein said engaging means on said base has a stationary projection fixed on said base, said second guide member has a substantially circular cross section, said engaged means of said second guide member has an engaging projection which projects from said second guide member and which is engaged with said stationary projection at a position displaced from a central position of said cross section, and an outer circumferential surface of said second guide member is in contact with said inclined surface of said elastic block at a position on the outer circumferential surface which is spaced apart from said engaging projection.

24. A linear guide apparatus according to claim 19, wherein said engaging means on said base has a rack fixed on said base and extending in a moving direction of said second guide member relative to said first guide member, said second guide member has a substantially circular cross section, said engaged means of said second guide member has a gear formed on an outer surface of an engaging projection projecting concentrically from each of two end surfaces of said second guide member in an extending direction thereof, and said second guide member is in contact with said inclined surface of said elastic block at a position on an outer circumferential surface of said second guide member spaced apart from a position on the outer circumferential surface where said gear of said engaged means meshes with said rack of said engaging means of said base.

25. A linear guide apparatus according to claim 19, wherein said engaging means on said base has a stationary projection fixed on said base, said second guide member has a substantially circular cross section, said engaged means of said second guide member has a recessed engaging portion formed in an outer circumferential surface of said second guide member and engaged with said stationary projection on said base, and said second guide member is in contact with said inclined surface of said elastic block at a position on the outer circumferential surface of said second guide member which is spaced apart from the recessed engaging portion.

26. A linear guide apparatus comprising:

a base;

a movable member formed independently of said base and movable with respect to said base;

first and second guide receptacles provided to said movable member;

a first guide member, fixed on said base, extending linearly, and received by said first guide receptacle, for guiding a moving direction of said first guide receptacle;

a second guide member, arranged on said base to extend in the same direction as that of said first guide member to be in parallel to said first guide member, and received by said second guide receptacle, for guiding a moving direction of said second guide receptacle; and pre-load adjusting means, provided on said base, for supporting said second guide member to be movable in parallel to said first guide member and adjusting a distance between said first and second guide members, thereby adjusting a pre-load applied between said first and second guide members and said first and second guide receptacles of said movable member, wherein said pre-load adjusting means has a fixing member which has an elasticity and fixes at least two positions thereof on said base, said at least two positions being spaced apart from each other in an extending direction of said second guide member, and said pre-load adjusting means presses said second guide member against said second guide receptacle with the elasticity of said fixing member.

27. A linear guide apparatus according to claim 26, wherein said second guide member and said fixing member are integrally formed of a plate member.

28. A linear guide apparatus according to claim 27, wherein a region of an outer surface of said second guide member which is brought into contact with said second guide receptacle of said movable member is constituted by a curved surface projecting toward said second guide receptacle in a cross section thereof, and a recessed portion recessed toward said second guide receptacle in a cross section thereof is formed in another region of said outer surface of said second guide member which opposes in a direction opposite to said region in a moving direction of said second guide member with respect to said first guide member.

29. A linear guide apparatus according to claim 26, wherein said second guide member, said fixing member, and said base are integrally formed with each other.

30. A linear guide apparatus according to claim 26, wherein said fixing member and said base are integrally formed with each other.

31. A linear guide apparatus comprising:

a base;

a movable member formed independently of said base and movable with respect to said base;

first and second guide receptacles provided to said movable member;

a first guide member, fixed on said base, extending linearly, and received by said first guide receptacle, for guiding a moving direction of said first guide receptacle;

a second guide member, arranged on said base to extend in the same direction as that of said first guide member to be in parallel to said first guide member, and received by said second guide receptacle, for guiding a moving direction of said second guide receptacle; and pre-load adjusting means, provided on said base, for supporting said second guide member to be movable in parallel to said first guide member and adjusting a distance between said first and second guide members, thereby adjusting a pre-load applied between said first and second guide members and said first and second guide receptacles of said movable member, wherein said pre-load adjusting means has a fixing member which fixes at least two positions thereof on said base, said at least two positions being spaced apart from each other in an extending direction of said second guide member, and said second guide member is pressed against said second guide receptacle between the two positions with an elasticity thereof.

32. A linear guide apparatus according to claim 31, wherein said fixing member has an elasticity, and said second guide member is further pressed against said second guide receptacle with the elasticity of said fixing member.

33. A linear guide apparatus according to claim 31, wherein a region of said second guide member located between the two positions has a thickness smaller than that of portions of said second guide member in a moving direction of the region relative to said first guide member, said portions corresponding to the two positions.

* * * * *